US012633141B2

(12) United States Patent
Imamura et al.

(10) Patent No.: US 12,633,141 B2
(45) Date of Patent: May 19, 2026

(54) PREDICTION DEVICE AND METHOD FOR DRIVER MICROSLEEP BASED ON EYE CLOSURE DURATION

(71) Applicant: Panasonic Intellectual Property Management Co., Ltd., Osaka (JP)

(72) Inventors: Chisato Imamura, Osaka (JP); Takayoshi Koyama, Osaka (JP); Wataru Nakai, Tokyo (JP); Soichi Kimura, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 287 days.

(21) Appl. No.: 18/381,452

(22) Filed: Oct. 18, 2023

(65) Prior Publication Data

US 2024/0144702 A1 May 2, 2024

(30) Foreign Application Priority Data

Oct. 26, 2022 (JP) .................................. 2022-171478

(51) Int. Cl.
| | |
|---|---|
| *G06V 20/59* | (2022.01) |
| *B60W 40/08* | (2012.01) |
| *G06V 10/98* | (2022.01) |
| *G06V 40/16* | (2022.01) |
| *G06V 40/19* | (2022.01) |
| *G07C 5/02* | (2006.01) |

(52) U.S. Cl.
CPC ........... *G06V 20/597* (2022.01); *B60W 40/08* (2013.01); *G06V 10/98* (2022.01); *G06V 40/166* (2022.01); *G06V 40/171* (2022.01);

*G06V 40/19* (2022.01); *B60W 2040/0827* (2013.01); *G07C 5/02* (2013.01)

(58) Field of Classification Search
None
See application file for complete search history.

(56) References Cited

U.S. PATENT DOCUMENTS

| | | | |
|---|---|---|---|
| 2017/0345276 A1* | 11/2017 | Stoltz | ................... G06V 20/597 |
| 2020/0276978 A1* | 9/2020 | Satou | ....................... G08G 1/16 |

FOREIGN PATENT DOCUMENTS

| JP | 3852294 B2 | 9/2006 |
|---|---|---|
| JP | 2009-048605 A | 3/2009 |

(Continued)

OTHER PUBLICATIONS

Caffier, P.P., Erdmann, U. & Ullsperger, P. Experimental evaluation of eye-blink parameters as a drowsiness measure. Eur J Appl Physiol 89, 319-325 (2003). (Year: 2003).*

(Continued)

*Primary Examiner* — Andrew M Moyer
*Assistant Examiner* — Caroline E. Depalma
(74) *Attorney, Agent, or Firm* — Greenblum & Bernstein, P.L.C.

(57) ABSTRACT

A prediction device includes a state detector that detects a state related to sleepiness of a driver; an eye-closure duration detector that detects an eye-closure duration of the driver; and a microsleep predictor that predicts that the driver is in the microsleep state, on conditions that the state detector detects the state related to the sleepiness of the driver and that the eye-closure duration detector detects the eye-closure duration that is no shorter than a first duration and no longer than a second duration.

11 Claims, 22 Drawing Sheets

(56) References Cited

FOREIGN PATENT DOCUMENTS

| | | | |
|---|---|---|---|
| JP | 2010-155072 | A | 7/2010 |
| JP | 2012-068841 | A | 4/2012 |
| JP | 5007975 | B2 | 6/2012 |
| JP | 2018-508870 | A | 3/2018 |
| WO | 2020184581 | A1 | 9/2020 |
| WO | 2022113275 | A1 | 6/2022 |

OTHER PUBLICATIONS

Y. Dong, Z. Hu, K. Uchimura and N. Murayama, "Driver Inattention Monitoring System for Intelligent Vehicles: A Review," in IEEE Transactions on Intelligent Transportation Systems, vol. 12, No. 2, pp. 596-614, Jun. 2011. (Year: 2011).*

A. Chowdhury, R. Shankaran, M. Kavakli and M. M. Haque, "Sensor Applications and Physiological Features in Drivers, Drowsiness Detection: A Review," in IEEE Sensors Journal, vol. 18, No. 8, pp. 3055-3067, 15 Apr. 15, 2018. (Year: 2018).*

Office Action dated Feb. 24, 2026 issued in Japanese Patent Application No. 2022-171478 along with an English translation.

* cited by examiner

Figure 12:
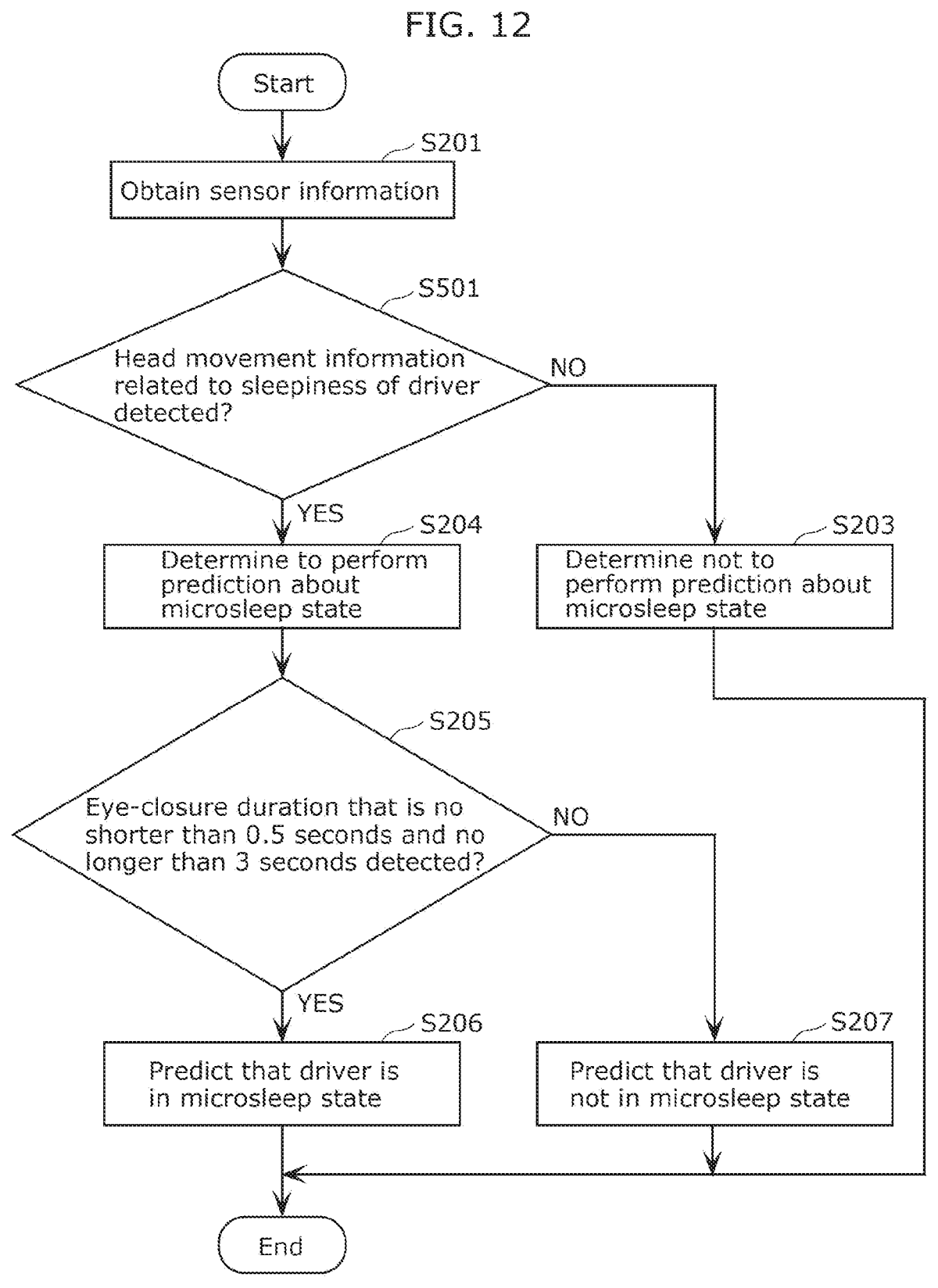

Start

S201
Obtain sensor information

S501
Head movement information related to sleepiness of driver detected?

NO

YES

S204
Determine to perform prediction about microsleep state

S203
Determine not to perform prediction about microsleep state

S205
Eye-closure duration that is no shorter than 0.5 seconds and no longer than 3 seconds detected?

NO

YES

S206
Predict that driver is in microsleep state

S207
Predict that driver is not in microsleep state

End

FIG. 14

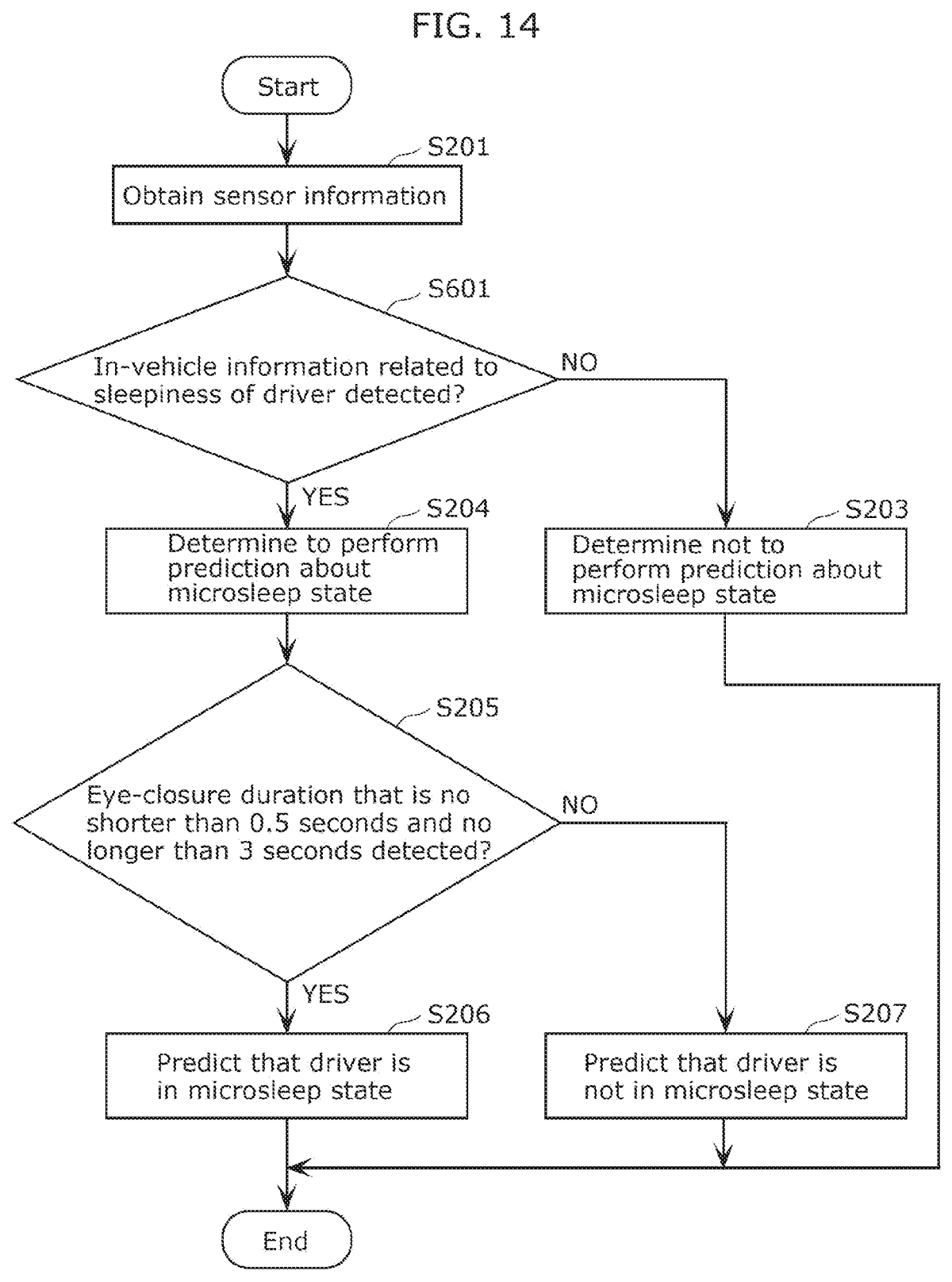

Start

S201
Obtain sensor information

S601
In-vehicle information related to sleepiness of driver detected?

NO

YES

S204
Determine to perform prediction about microsleep state

S203
Determine not to perform prediction about microsleep state

S205
Eye-closure duration that is no shorter than 0.5 seconds and no longer than 3 seconds detected?

NO

YES

S206
Predict that driver is in microsleep state

S207
Predict that driver is not in microsleep state

End

FIG. 17

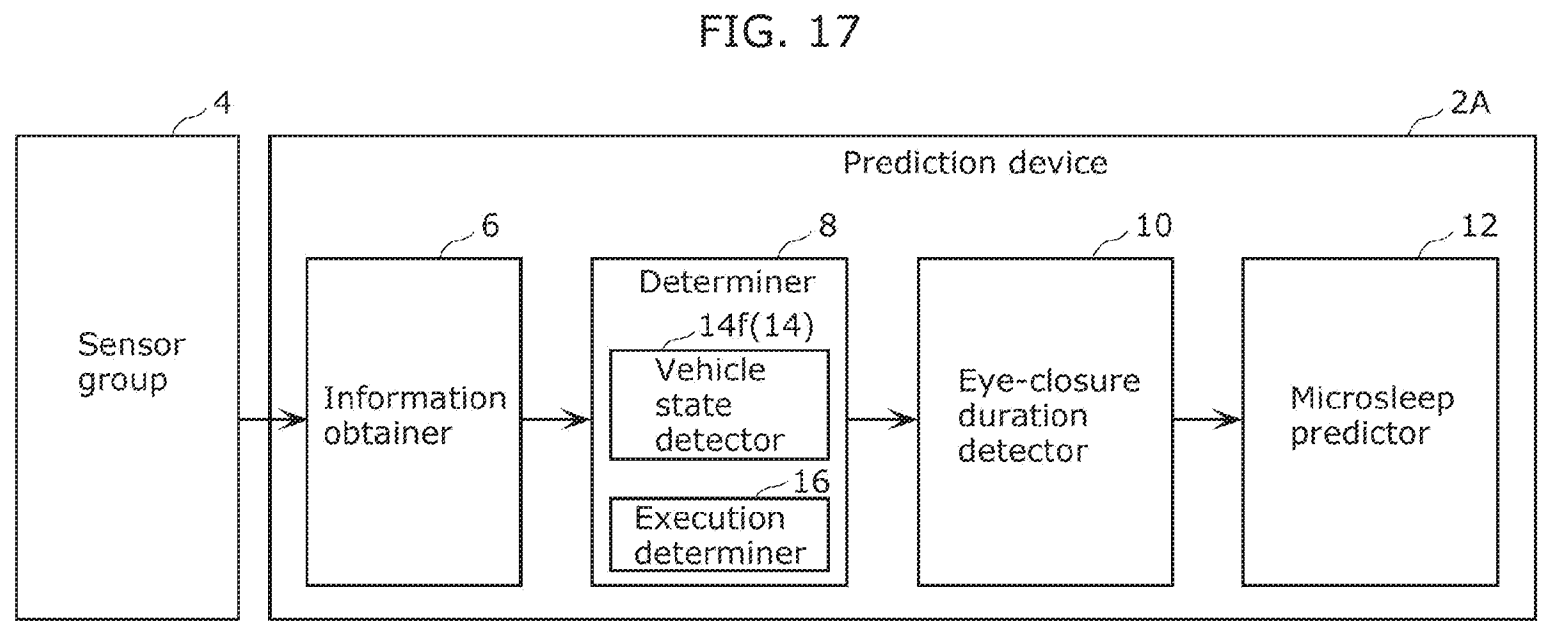

Prediction device — 2A

Sensor group — 4

Information obtainer — 6

Determiner — 8
14f(14)
Vehicle state detector
Execution determiner — 16

Eye-closure duration detector — 10

Microsleep predictor — 12

Figure 20:
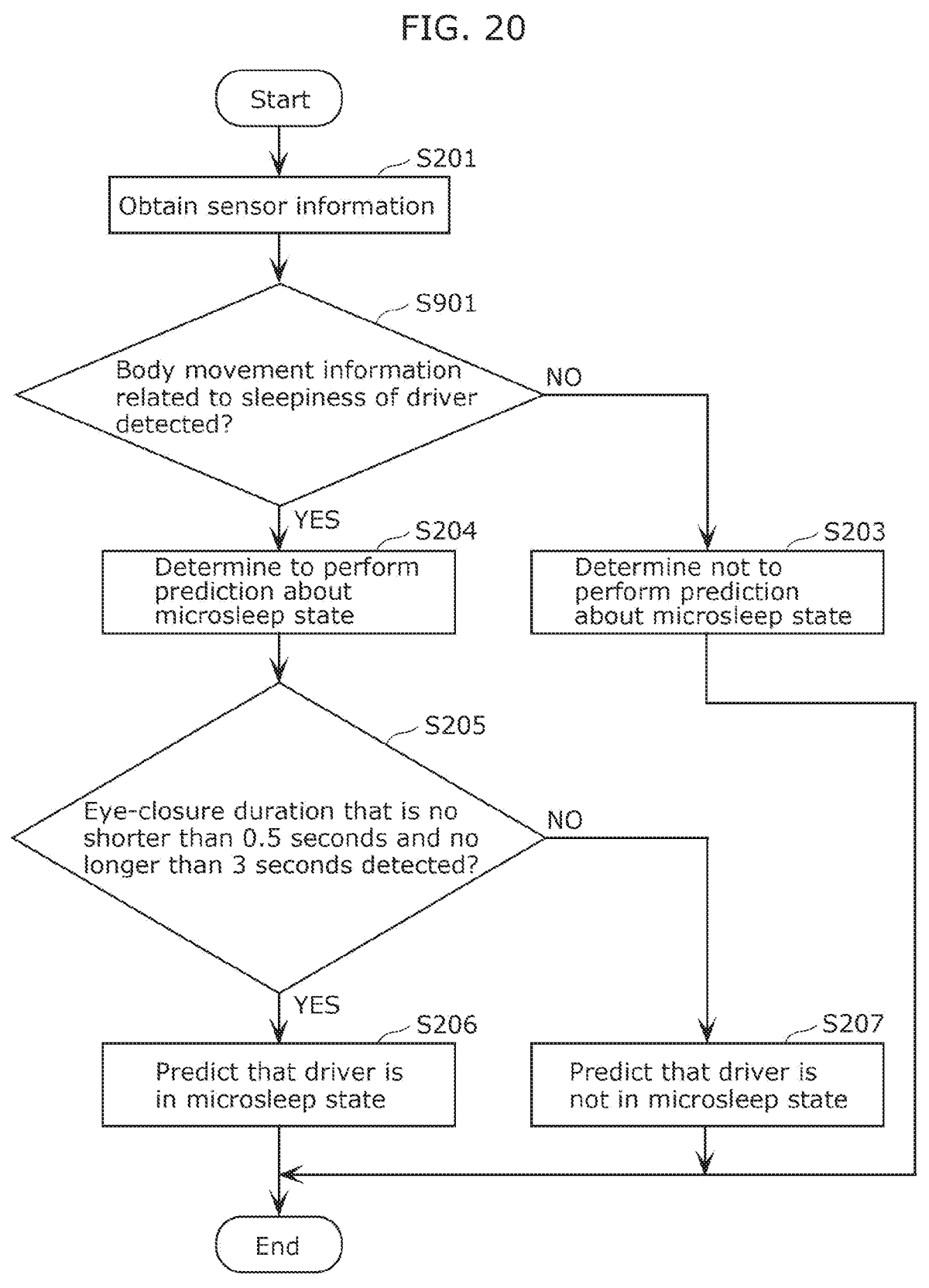

```
                    ┌─────────┐
                    │  Start  │
                    └─────────┘
                         │
                         ▼            S201
          ┌──────────────────────────────┐
          │   Obtain sensor information   │
          └──────────────────────────────┘
                         │
                         ▼                  S901
                   ◇─────────────◇
                 ╱                 ╲
                ╱  Body movement    ╲      NO
               ╱  information        ╲──────────────┐
               ╲  related to         ╱              │
                ╲ sleepiness of     ╱               │
                 ╲ driver detected?╱                │
                   ◇─────────────◇                  │
                         │ YES                       │
                         ▼         S204              ▼          S203
          ┌──────────────────────────┐  ┌──────────────────────────┐
          │  Determine to perform    │  │  Determine not to         │
          │  prediction about        │  │  perform prediction       │
          │  microsleep state        │  │  about microsleep state   │
          └──────────────────────────┘  └──────────────────────────┘
                         │                            │
                         ▼            S205            │
                   ◇─────────────◇                    │
                 ╱                 ╲                   │
                ╱ Eye-closure       ╲     NO           │
               ╱  duration that is   ╲────────┐        │
               ╲  no shorter than    ╱        │        │
                ╲ 0.5 seconds and   ╱         │        │
                 ╲ no longer than   ╱         │        │
                  ╲3 seconds        ╱         │        │
                   ◇detected?─────◇           │        │
                         │ YES                 │        │
                         ▼          S206       ▼  S207  │
          ┌──────────────────────┐  ┌──────────────────────┐
          │  Predict that driver  │  │  Predict that driver  │
          │  is in microsleep     │  │  is not in microsleep │
          │  state                │  │  state                │
          └──────────────────────┘  └──────────────────────┘
                         │                    │        │
                         ▼◄───────────────────┴────────┘
                    ┌─────────┐
                    │   End   │
                    └─────────┘
```

FIG. 21

PREDICTION DEVICE AND METHOD FOR DRIVER MICROSLEEP BASED ON EYE CLOSURE DURATION

CROSS REFERENCE TO RELATED APPLICATION

The present application is based on and claims priority of Japanese Patent Application No. 2022-171478 filed on Oct. 26, 2022.

FIELD

The present disclosure relates to a prediction device and a prediction method.

BACKGROUND

It is known that a driver who feels very sleepy while driving a vehicle may fall into an instantaneous sleep state called "microsleep" at a phase before completely falling asleep. In view of risk avoidance and accident prevention, detection devices for detecting such a microsleep state of the driver have been developed (see Patent Literature (PTL) 1, for example). Such a detection device detects the microsleep state of a driver, based on an eye-closure state of the driver.

CITATION LIST

Patent Literature

PTL 1: Japanese Unexamined Patent Application Publication (Translation of PCT Application) No. 2018-508870

SUMMARY

However, the detection devices in the above related art can be improved upon.

In view of this, the present disclosure provides a prediction device and a prediction method each capable of improving upon the above related art.

In accordance with an aspect of the present disclosure, a prediction device that predicts that a driver of a vehicle is in a microsleep state includes: a state detector that detects a state related to sleepiness of the driver; an eye-closure duration detector that detects an eye-closure duration of the driver; and a microsleep predictor that predicts that the driver is in the microsleep state, on conditions that the state detector detects the state related to the sleepiness of the driver and that the eye-closure duration detector detects the eye-closure duration that is no shorter than a first duration and no longer than a second duration.

General or specific aspects of the present disclosure may be implemented to a system, a method, an integrated circuit, a computer program, a computer-readable recording medium such as a Compact Disc-Read Only Memory (CD-ROM), or any given combination thereof.

A prediction device or the like according to one aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 1 is a block diagram illustrating a configuration of a prediction device according to Embodiment 1.

FIG. 5 is a block diagram illustrating a configuration of a prediction device according to Variation 1 of Embodiment 2.

FIG. 12 is a flowchart of an operation performed by the prediction device according to Embodiment 2 in Application example 3 of the state detector.

FIG. 14 is a flowchart of an operation performed by the prediction device according to Embodiment 2 in Application example 4 of the state detector.

FIG. 17 is a block diagram illustrating a configuration of the prediction device according to Embodiment 2 in Application example 6 of the state detector.

FIG. 19 is a block diagram illustrating a configuration of the prediction device according to Embodiment 2 in Application example 7 of the state detector.

FIG. 20 is a flowchart of an operation performed by the prediction device according to Embodiment 2 in Application example 7 of the state detector.

FIG. 21 is a block diagram illustrating a configuration of a prediction device according to Embodiment 3.

DESCRIPTION OF EMBODIMENTS

Figure 2:
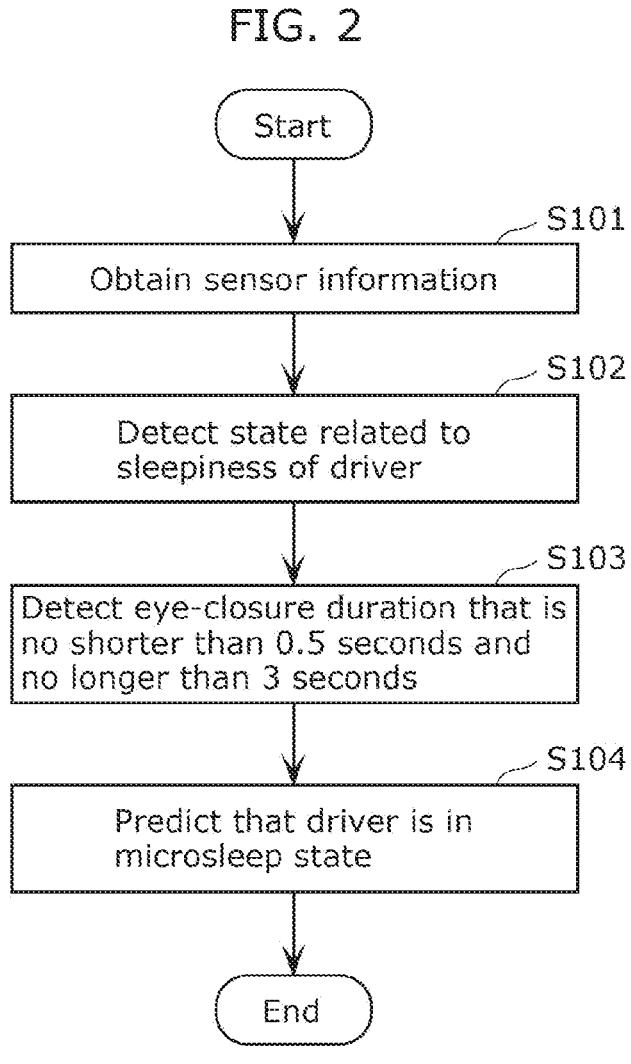
FIG. 2 is a flowchart of an operation performed by the prediction device according to Embodiment 1.

Underlying Knowledge Forming Basis of the Present Disclosure

The present inventors found that the following issue is caused by the technology described in "Background".

If a driver intentionally closes the eyes because a contact lens is out of place for example, a conventional detection device may erroneously detect that the driver is in the microsleep state.

In order to solve the above problem, in accordance with a first aspect of the present disclosure, a prediction device that predicts that a driver of a vehicle is in a microsleep state includes: a state detector that detects a state related to sleepiness of the driver; an eye-closure duration detector that detects an eye-closure duration of the driver; and a microsleep predictor that predicts that the driver is in the microsleep state, on conditions that the state detector detects the state related to the sleepiness of the driver and that the eye-closure duration detector detects the eye-closure duration that is no shorter than a first duration and no longer than a second duration.

According to this aspect, the microsleep predictor predicts that the driver is in the microsleep state in consideration of the state related to the sleepiness of the driver and the eye-closure duration of the driver. This enables an accurate prediction on the microsleep state.

In accordance with a second aspect of the present disclosure, it is also possible in the first aspect that the first duration is 0.5 seconds and the second duration is 3 seconds.

According to this aspect, if the driver falls into an instantaneous sleep state for no shorter than 0.5 seconds and no longer than 3 seconds, the microsleep predictor predicts that the driver is in the microsleep state.

In accordance with a third aspect of the present disclosure, it is also possible in the first or second aspect that the prediction device further includes: an execution determiner that determines that the microsleep predictor is to perform prediction about the microsleep state of the driver when the state detector detects the state related to the sleepiness of the driver, and determines that the microsleep predictor is not to perform prediction about the microsleep state of the driver when the state detector does not detect the state related to the sleepiness of the driver.

According to this aspect, no detection of the state related to the sleepiness of the driver by state detector 14 indicates that the driver is highly unlikely to feel sleepy. In such a case, the microsleep predictor can avoid making an unnecessary prediction on the microsleep state of the driver.

In accordance with a fourth aspect of the present disclosure, it is also possible in any one of the first to third aspects that the state detector detects life log information about life of the driver as the state related to the sleepiness of the driver, and that the microsleep predictor predicts that the driver is in the microsleep state, on conditions that the state detector detects the life log information and that the eye-closure duration detector detects the eye-closure duration that is no shorter than the first duration and no longer than the second duration.

According to this aspect, the microsleep predictor predicts that the driver is in the microsleep state in consideration of the life log information related to the sleepiness of the driver and the eye-closure duration of the driver. This enables an accurate prediction on the microsleep state.

In accordance with a fifth aspect of the present disclosure, it is also possible in any one of the first to third aspects that in the state detector detects facial-feature movement information indicating a movement of a facial feature of the driver as the state related to the sleepiness of the driver, and that the microsleep predictor predicts that the driver is in the microsleep state, on conditions that the state detector detects the facial-feature movement information and that the eye-closure duration detector detects the eye-closure duration that is no shorter than the first duration and no longer than the second duration.

According to this aspect, the microsleep predictor predicts that the driver is in the microsleep state in consideration of the facial-feature movement information related to the sleepiness of the driver and the eye-closure duration of the driver. This enables an accurate prediction on the microsleep state.

In accordance with a sixth aspect of the present disclosure, it is also possible in any one of the first to third aspects that the state detector detects head movement information indicating a movement of a head of the driver as the state related to the sleepiness of the driver, and that the microsleep predictor predicts that the driver is in the microsleep state, on conditions that the state detector detects the head movement information and that the eye-closure duration detector detects the eye-closure duration that is no shorter than the first duration and no longer than the second duration.

According to this aspect, the microsleep predictor predicts that the driver is in the microsleep state in consideration of the head movement information related to the sleepiness of the driver and the eye-closure duration of the driver. This enables an accurate prediction on the microsleep state.

In accordance with a seventh aspect of the present disclosure, it is also possible in any one of the first to third aspects that the state detector detects in-vehicle information indicating a state inside the vehicle as the state related to the sleepiness of the driver, and that the microsleep predictor predicts that the driver is in the microsleep state, on conditions that the state detector detects the in-vehicle information and that the eye-closure duration detector detects the eye-closure duration that is no shorter than the first duration and no longer than the second duration.

According to this aspect, the microsleep predictor predicts that the driver is in the microsleep state in consideration of the in-vehicle information related to the sleepiness of the driver and the eye-closure duration of the driver. This enables an accurate prediction on the microsleep state.

In accordance with an eighth aspect of the present disclosure, it is also possible in any one of the first to third aspects that the state detector detects vital information on the driver as the state related to the sleepiness of the driver, and that the microsleep predictor predicts that the driver is in the microsleep state, on conditions that the state detector detects the vital information and that the eye-closure duration detector detects the eye-closure duration that is no shorter than the first duration and no longer than the second duration. According to this aspect, the microsleep predictor predicts that the driver is in the microsleep state in consideration of the vital information related to the sleepiness of the driver and the eye-closure duration of the driver. This enables an accurate prediction on the microsleep state.

In accordance with a ninth aspect of the present disclosure, it is also possible in any one of the first to third aspects that the state detector detects vehicle state information indicating state of the vehicle as the state related to the sleepiness of the driver, and that the microsleep predictor predicts that the driver is in the microsleep state, on conditions that the state detector detects the vehicle state information and that the eye-closure duration detector detects the eye-closure duration that is no shorter than the first duration and no longer than the second duration.

According to this aspect, the microsleep predictor predicts that the driver is in the microsleep state in consideration of the vehicle state information related to the sleepiness of the driver and the eye-closure duration of the driver. This enables an accurate prediction on the microsleep state.

In accordance with a tenth aspect of the present disclosure, it is also possible in any one of the first to third aspects that the state detector detects body movement information indicating a body movement of the driver as the state related to the sleepiness of the driver, and that the microsleep predictor predicts that the driver is in the microsleep state, on conditions that the state detector detects the body movement information and that the eye-closure duration detector detects the eye-closure duration that is no shorter than the first duration and no longer than the second duration.

According to this aspect, the microsleep predictor predicts that the driver is in the microsleep state in consideration of the body movement information related to the sleepiness of the driver and the eye-closure duration of the driver. This enables an accurate prediction on the microsleep state.

In accordance with an eleventh aspect of the present disclosure, it is also possible in any one of the first to tenth aspects that the prediction device further includes: an erroneous-prediction situation detector that detects an erroneous prediction situation that affects prediction about the microsleep state of the driver made by the microsleep predictor, wherein the microsleep predictor is not to perform prediction about the microsleep state of the driver when the erroneous-prediction situation detector detects the erroneous prediction situation.

According to this aspect, an erroneous prediction made by the microsleep predictor on the microsleep state of the driver can be reduced.

In accordance with a twelfth aspect of the present disclosure, a prediction method of predicting that a driver of a vehicle is in a microsleep state includes: (a) detecting a state related to sleepiness of the driver; (b) detecting an eye-closure duration of the driver; and (c) predicting that the driver is in the microsleep state, on conditions that the state related to the sleepiness of the driver is detected in step (a) and that the eye-closure duration that is no shorter than a first duration and no longer than a second duration is detected in step (b).

According to this aspect, the driver is predicted to be in the microsleep state in consideration of the state related to the sleepiness of the driver and the eye-closure duration of the driver. This enables an accurate prediction on the microsleep state.

General or specific aspects of the present disclosure may be implemented to a system, a method, an integrated circuit, a computer program, a computer-readable recording medium such as a Compact Disc-Read Only Memory (CD-ROM), or any given combination thereof.

Hereinafter, certain exemplary embodiments will be described in detail with reference to the accompanying Drawings.

The following embodiments are general or specific examples of the present disclosure. The numerical values, shapes, materials, elements, arrangement and connection configuration of the elements, steps, the order of the steps, etc., described in the following embodiments are merely examples, and are not intended to limit the present disclosure. Among elements in the following embodiments, those not described in any one of the independent claims indicating the broadest concept of the present disclosure are described as optional elements.

Embodiment 1

1-1. Configuration of Prediction Device

Figure 1:
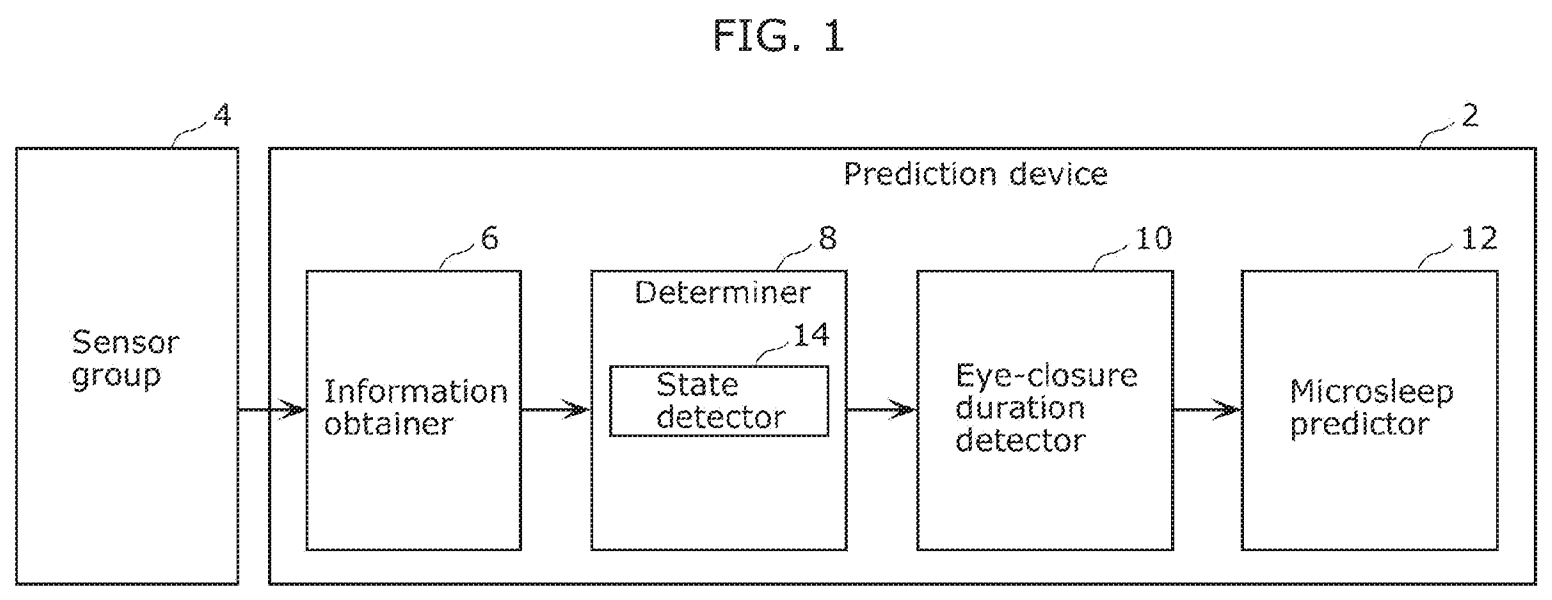

A configuration of prediction device 2 according to Embodiment 1 is described with reference to FIG. 1. FIG. 1 is a block diagram illustrating the configuration of prediction device 2 according to Embodiment 1.

As illustrated in FIG. 1, prediction device 2 detects the microsleep state of a driver of a vehicle. The vehicle includes prediction device 2 and sensor group 4. The vehicle is an automobile, such as a regular passenger car, a bus, or a truck. Note that the vehicle is not limited to an automobile and may be a construction machine or a farm machine, for example.

Sensor group 4 includes at least one sensor. The at least one sensor detects information about at least one of the vehicle and the driver sitting in the driver seat of the vehicle, and outputs sensor information indicating the detection result. For example, sensor group 4 includes an imager, a biosensor, and a vehicle-state sensor.

The imager is a camera that images the driver sitting in the driver seat of the vehicle. Examples applicable to the imager include: a camera that includes a complementary metal oxide semiconductor (CMOS) image sensor; and a camera that includes a charge-coupled device (CCD) image sensor. The imager outputs, as the sensor information, image information including an image of the driver to prediction device 2.

The biosensor detects biological information (such as blood pressure, body temperature, respiration rate, heart rate, and amount of muscle activity) on the driver sitting in the driver seat of the vehicle. The biosensor outputs, as the sensor information, the detected biological information to prediction device 2.

The vehicle state sensor detects a speed and an acceleration of the vehicle, for example. The vehicle state sensor outputs, as the sensor information, vehicle state information indicating the detected speed and acceleration to prediction device 2.

Prediction device 2 includes information obtainer 6, determiner 8, eye-closure duration detector 10, and microsleep predictor 12. Note that prediction device 2 may include the at least one sensor included in sensor group 4 described above, as a structural component.

Information obtainer 6 obtains the sensor information outputted from sensor group 4 and outputs the obtained sensor information to determiner 8. Furthermore, information obtainer 6 also outputs the sensor information obtained from sensor group 4 to eye-closure duration detector 10 via determiner 8. Note that information obtainer 6 may output the sensor information obtained from sensor group 4 directly to eye-closure duration detector 10, not via determiner 8.

Determiner 8 includes state detector 14. State detector 14 detects a state related to sleepiness of the driver, based on the sensor information from information obtainer 6. Note that "the state related to the sleepiness of the driver" in the present specification refers to: a state (or condition) of the driver that is predicted to be feeling sleepy or of the vehicle in which the driver is predicted to be feeling sleepy; or a state (or condition) of the driver that is highly likely to feel sleepy or of the vehicle in which the driver is highly likely to feel sleepy. State detector 14 outputs the detection result on the state related to the sleepiness of the driver to microsleep predictor 12 via eye-closure duration detector 10. Note that state detector 14 may output the detection result on the state related to the sleepiness of the driver directly to microsleep predictor 12, not via eye-closure duration detector 10.

Eye-closure duration detector 10 detects an eye-closure duration of the driver, based on the sensor information from information obtainer 6. For example, for the sensor information including image information, eye-closure duration detector 10 detects the eye-closure duration of the driver by analyzing the image of the eyes of the driver included in the image information. Here, the eye-closure duration refers to a duration during which the eyes of the driver are closed, or more specifically, a duration from when the eyelids of the driver start closing until when the eyelids are opened again after being closed. Eye-closure duration detector 10 outputs the detection result on the eye-closure duration to microsleep predictor 12. Although eye-closure duration detector 10 detects the eye-closure duration of the driver based on the sensor information from information obtainer 6 in the present embodiment, this is not intended to be limiting. The eye-closure duration of the driver may be detected using deep learning, for example.

Microsleep predictor 12 predicts that the driver is in the microsleep state, on conditions that state detector 14 detects the state related to the sleepiness of the driver and that eye-closure duration detector 10 detects the eye-closure duration that is no shorter than 0.5 seconds (an example of a first duration) and no longer than 3 seconds (an example of a second duration).

Although the condition for predicting the microsleep state is that the eye-closure duration is no shorter than 0.5 seconds and no longer than 3 seconds in the present embodiment, this is not intended to be limiting. For example, the eye-closure duration may be no shorter than 1 second and no longer than 4 seconds. The first duration and the second duration can be freely set.

The prediction result obtained by microsleep predictor 12 is outputted to, for example, a controller area network (CAN) of the vehicle. This enables controls to cause, if the driver is predicted to be in the microsleep state, an alarm to go off to wake up the driver or cause the vehicle to perform a fallback operation in order to safely stop, for example. Note that the fallback operation is performed by controlling the steering wheel to pull the vehicle over to a side (or a shoulder) of a road or controlling the engine or the brake to decrease the speed of the vehicle, for example.

1-2. Operation of Prediction Device

Next, an operation performed by prediction device 2 according to Embodiment 1 is described with reference to FIG. 2. FIG. 2 is a flowchart of the operation performed by prediction device 2 according to Embodiment 1.

As illustrated in FIG. 2, information obtainer 6 obtains the sensor information outputted from sensor group 4 (S101) and outputs the obtained sensor information to each of determiner 8 and eye-closure duration detector 10.

Next, state detector 14 detects the state related to the sleepiness of the driver, based on the sensor information from information obtainer 6 (S102). State detector 14 outputs the detection result on the state related to the sleepiness of the driver to microsleep predictor 12.

Next, eye-closure duration detector 10 detects the eye-closure duration that is no shorter than 0.5 seconds and no longer than 3 seconds, based on the sensor information from information obtainer 6 (S103). Eye-closure duration detector 10 outputs the detection result on the eye-closure duration to microsleep predictor 12.

Next, microsleep predictor 12 predicts that the driver is in the microsleep state (S104). To be more specific, microsleep predictor 12 predicts that the driver is in the microsleep state, on conditions that state detector 14 detects the state related to the sleepiness of the driver and that eye-closure duration detector 10 detects the eye-closure duration that is no shorter than 0.5 seconds and no longer than 3 seconds.

1-3. Advantageous Effect

If the driver intentionally closes the eyes because a contact lens is out of place for example, the driver is highly unlikely to feel sleepy. In this case, state detector 14 does not detect the state related to the sleepiness of the driver. Microsleep predictor 12 according to the present embodiment predicts that the driver is in the microsleep state in consideration of the state related to the sleepiness of the driver and the eye-closure duration of the driver. This prevents erroneous detection of the microsleep state when, for example, the driver intentionally closes the eyes. As a result, the microsleep state can be accurately predicted.

Embodiment 2

2-1. Configuration of Prediction Device

Figure 3:
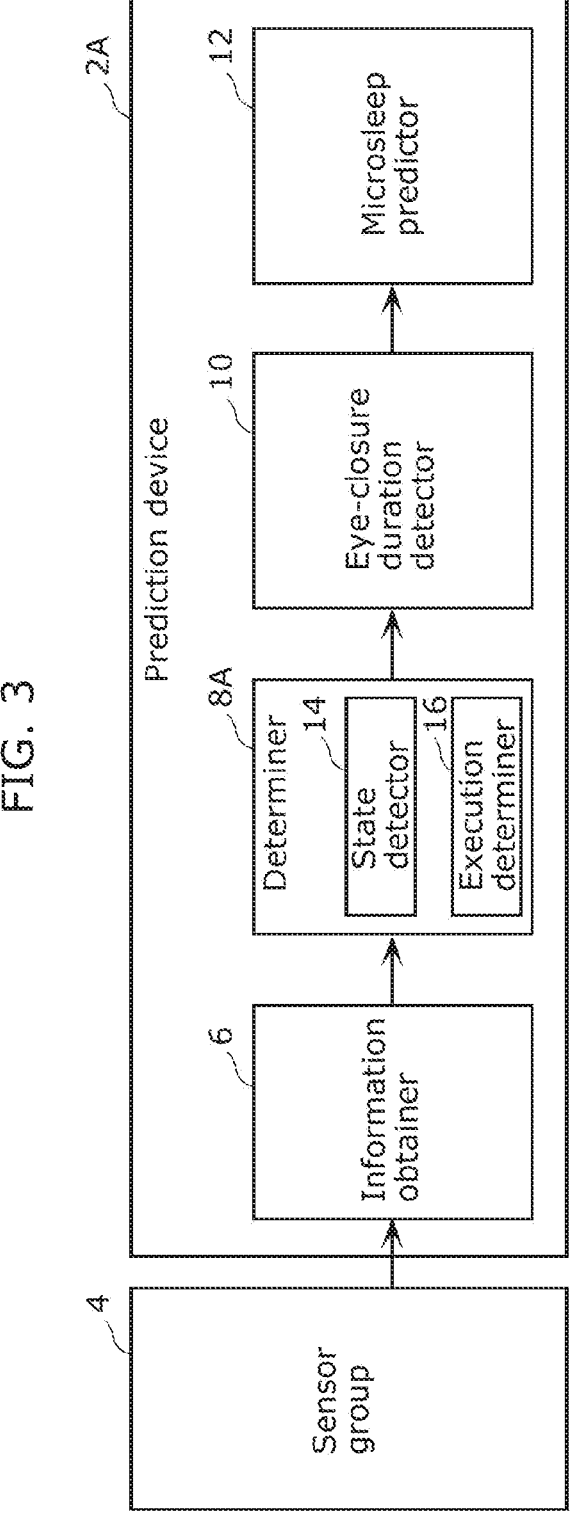
FIG. 3 is a block diagram illustrating a configuration of a prediction device according to Embodiment 2.

A configuration of prediction device 2A according to Embodiment 2 is described with reference to FIG. 3. FIG. 3 is a block diagram illustrating a configuration of prediction device 2A according to Embodiment 2. Note that structural components in the block diagram of FIG. 3 that are identical to those in FIG. 1 described above are denoted by reference marks identical to those used in FIG. 1, and that descriptions on these structural components are thus omitted here.

As illustrated in FIG. 3, determiner 8A of prediction device 2A according to the present embodiment includes execution determiner 16 in addition to state detector 14 described above in Embodiment 1.

State detector 14 outputs the detection result on the state related to the sleepiness of the driver, to microsleep predictor 12 via eye-closure duration detector 10 and also to execution determiner 16. Application examples of state detector 14 area described later.

Execution determiner 16 determines, based on the detection result from state detector 14, whether microsleep predictor 12 is to perform prediction about the microsleep state of the driver. To be more specific, if state detector 14 detects the state related to the sleepiness of the driver, execution determiner 16 determines that microsleep predictor 12 is to perform prediction about the microsleep state of the driver. This is because the detection of the state related to the sleepiness of the driver by state detector 14 indicates that the driver is highly likely to feel sleepy. In contrast, if state detector 14 does not detect the state related to the sleepiness of the driver, execution determiner 16 determines that microsleep predictor 12 is not to perform prediction about the microsleep state of the driver. This is because no detection of the state related to the sleepiness of the driver by state detector 14 indicates that the driver is highly unlikely to feel sleepy. Execution determiner 16 outputs the determination result to microsleep predictor 12 via eye-closure duration detector 10. Note that execution determiner 16 may output the determination result directly to microsleep predictor 12, not via eye-closure duration detector 10.

2-2. Operation of Prediction Device

Figure 4:
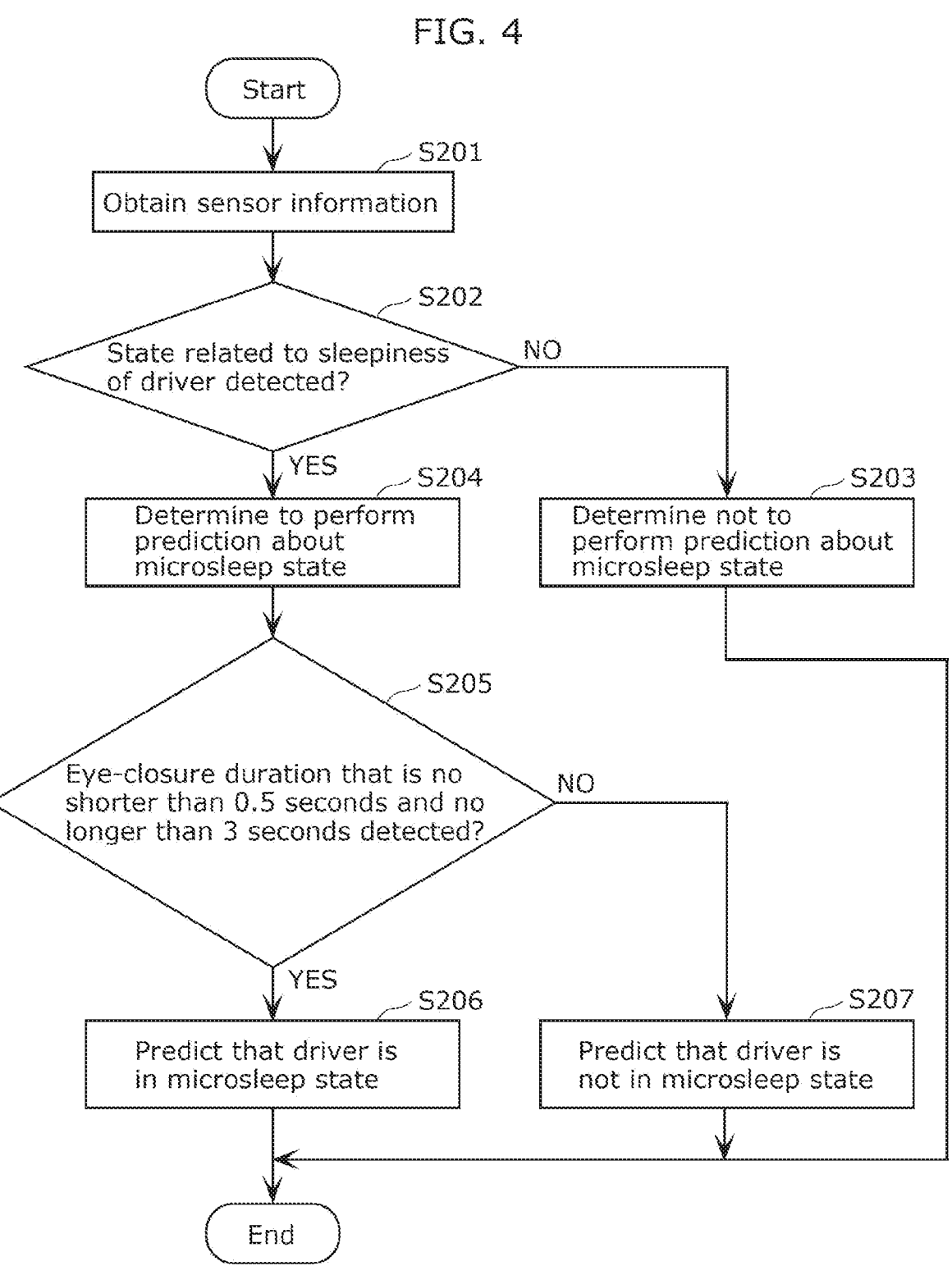
FIG. 4 is a flowchart of an operation performed by the prediction device according to Embodiment 2.

Next, an operation performed by prediction device 2A according to Embodiment 2 is described with reference to FIG. 4. FIG. 4 is a flowchart of the operation performed by prediction device 2A according to Embodiment 2.

As illustrated in FIG. 4, information obtainer 6 obtains the sensor information from sensor group 4 (S201) and outputs the obtained sensor information to each of state detector 14 of determiner 8A and eye-closure duration detector 10.

Next, state detector 14 tries detecting the state related to the sleepiness of the driver, based on the sensor information from information obtainer 6. If state detector 14 does not detect the state related to the sleepiness of the driver (NO in S202), execution determiner 16 determines, based on the detection result from state detector 14, that microsleep predictor 12 is not to perform prediction about the microsleep state of the driver (S203). In this case, based on the determination result from execution determiner 16, microsleep predictor 12 does not predict the microsleep state of the driver.

Referring back to Step S202, if state detector 14 detects the state related to the sleepiness of the driver (YES in S202), execution determiner 16 determines, based on the detection result from state detector 14, that microsleep predictor 12 is to perform prediction about the microsleep state of the driver (S204). State detector 14 outputs the detection result on the state related to the sleepiness of the driver to microsleep predictor 12.

After Step S204, eye-closure duration detector 10 detects the eye-closure duration of the driver based on the sensor information from information obtainer 6. If eye-closure duration detector 10 detects the eye-closure duration that is no shorter than 0.5 seconds and no longer than 3 seconds (YES in S205), microsleep predictor 12 predicts that the driver is in the microsleep state (S206). To be more specific, microsleep predictor 12 predicts that the driver is in the microsleep state, on conditions that state detector 14 detects the state related to the sleepiness of the driver and that eye-closure duration detector 10 detects the eye-closure duration that is no shorter than 0.5 seconds and no longer than 3 seconds.

Referring back to Step S205, if eye-closure duration detector 10 does not detect the eye-closure duration that is no shorter than 0.5 seconds and no longer than 3 seconds (NO in S205), microsleep predictor 12 predicts that the driver is not in the microsleep state (S207).

2-3. Advantageous Effect

In the present embodiment, if state detector 14 does not detect the state related to the sleepiness of the driver, execution determiner 16 determines that microsleep predictor 12 is not to perform prediction about the microsleep state of the driver. No detection of the state related to the sleepiness of the driver by state detector 14 indicates that the driver is highly unlikely to feel sleepy. In such a case, microsleep predictor 12 can avoid making an unnecessary prediction on the microsleep state of the driver.

2-4. Variation 1

Figure 5:
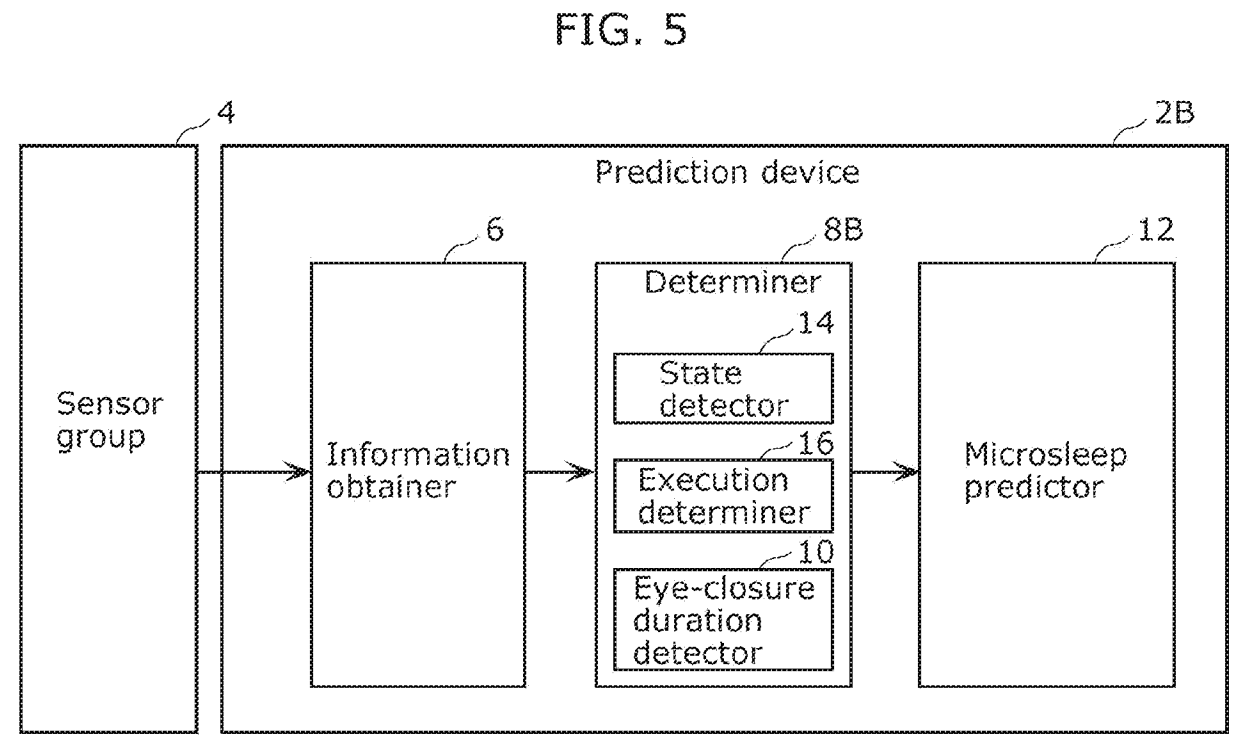

Prediction device 2B according to Variation 1 of Embodiment 2 is described with reference to FIG. 5. FIG. 5 is a block diagram illustrating a configuration of prediction device 2B according to Variation 1 of Embodiment 2. Note that structural components in the block diagram of FIG. 5 that are identical to those in FIG. 3 described above are denoted by reference marks identical to those used in FIG. 3, and that descriptions on these structural components are thus omitted here.

As illustrated in FIG. 5, determiner 8B of prediction device 2B according to the present variation includes eye-closure duration detector 10 in addition to state detector 14 and execution determiner 16. To be more specific, determiner 8B has the function of eye-closure duration detector 10. This configuration can also achieve the same advantageous effect described above.

2-5. Variation 2

Figure 6:
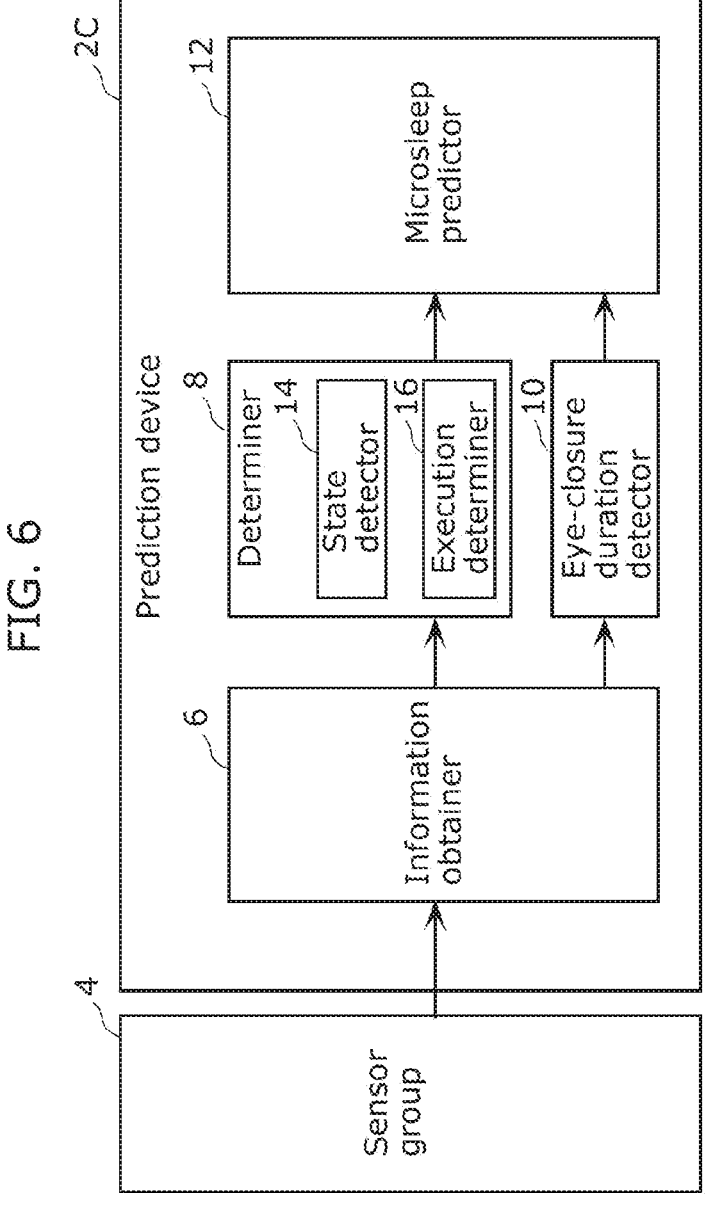
FIG. 6 is a block diagram illustrating a configuration of a prediction device according to Variation 2 of Embodiment 2.

Prediction device 2C according to Variation 2 of Embodiment 2 is described with reference to FIG. 6. FIG. 6 is a block diagram illustrating a configuration of prediction device 2C according to Variation 2 of Embodiment 2. Note that structural components in the block diagram of FIG. 6 that are identical to those in FIG. 3 described above are denoted by reference marks identical to those used in FIG. 3, and that descriptions on these structural components are thus omitted here.

As illustrated in FIG. 6, eye-closure duration detector 10 of prediction device 2C according to the present variation is connected in parallel to determiner 8 with respect to information obtainer 6. With this, information obtainer 6 outputs the sensor information obtained from sensor group 4 directly to eye-closure duration detector 10, not via determiner 8. State detector 14 outputs the detection result on the state related to the sleepiness of the driver directly to microsleep predictor 12, not via eye-closure duration detector 10. Execution determiner 16 outputs the determination result directly to microsleep predictor 12, not via eye-closure duration detector 10. This configuration can also achieve the same advantageous effect described above.

2-6. Application Example 1 of State Detector

Figure 7:
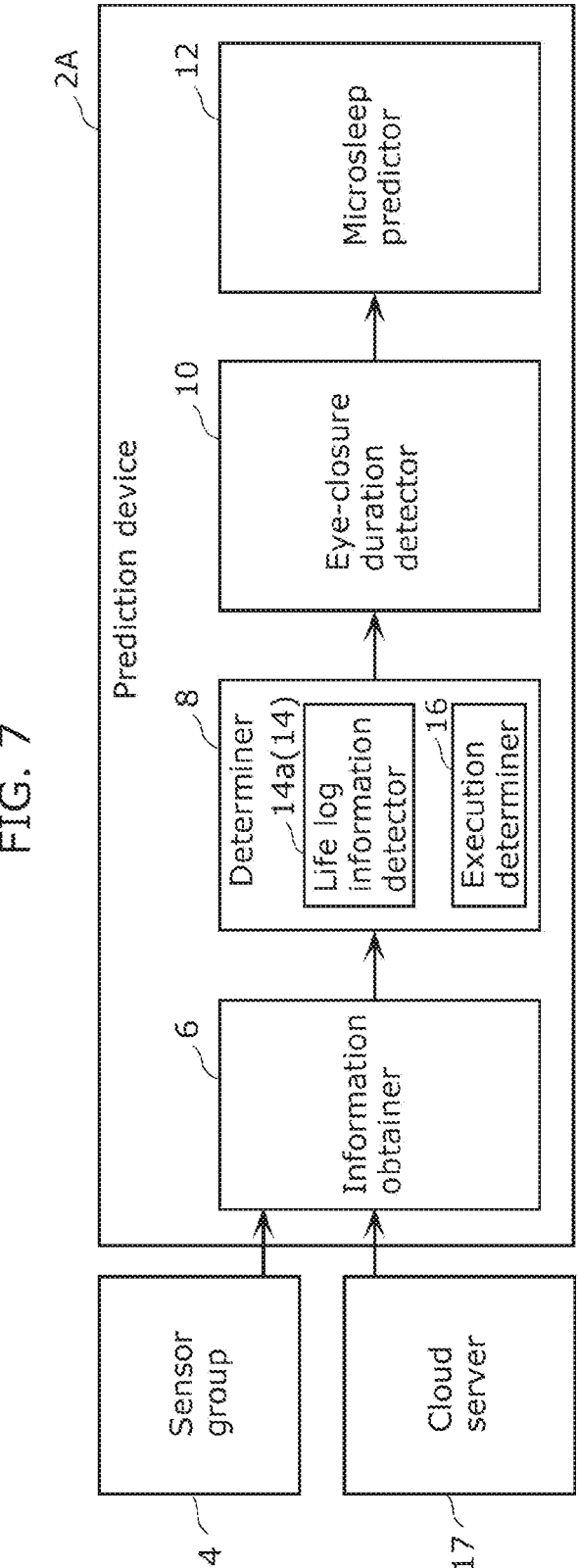
FIG. 7 is a block diagram illustrating a configuration of the prediction device according to Embodiment 2 in Application example 1 of the state detector.

Application example 1 of state detector 14 is described with reference to FIG. 7. FIG. 7 is a block diagram illustrating a configuration of prediction device 2A according to Embodiment 2 in Application example 1 of state detector 14. Note that structural components in the block diagram of FIG. 7 that are identical to those in FIG. 3 described above are denoted by reference marks identical to those used in FIG. 3, and that descriptions on these structural components are thus omitted here.

As illustrated in FIG. 7, information obtainer 6 in Application example 1 obtains the sensor information from sensor group 4 and also obtains physical information indicating, for example, height and weight of the driver from cloud server 17. Information obtainer 6 outputs the sensor information obtained from sensor group 4 to eye-closure duration detector 10 via determiner 8. Furthermore, information obtainer 6 outputs the physical information obtained from cloud server 17 to determiner 8. Note that cloud server 17 is connected via a network to measuring instruments including a weight scale that the driver has at home. Note also that information from each of the measuring instruments is periodically stored as physical information into cloud server 17 via the network.

State detector 14 is applied to life log information detector 14a. Life log information detector 14a detects life log information about life of the driver, based on the physical information obtained from information obtainer 6. For example, by analyzing the physical information obtained from information obtainer 6, life log information detector 14a detects information indicating the body shape of the driver (slender or obese, for example) as life log information. Life log information detector 14a outputs the detected life log information to microsleep predictor 12 via eye-closure duration detector 10 and also to execution determiner 16. Note that, by analyzing the physical information obtained from information obtainer 6, life log information detector 14*a* may also detect information indicating the BMI (body mass index) of the driver as the life log information.

Microsleep predictor 12 predicts that the driver is in the microsleep state, on conditions that life log information detector 14*a* detects the life log information related to the sleepiness of the driver and that eye-closure duration detector 10 detects the eye-closure duration that is no shorter than 0.5 seconds and no longer than 3 seconds. Here, the life log information related to the sleepiness of the driver indicates that the driver is obese, for example. This is because an obese person is likely to suffer from sleep apnea syndrome and thus easily falls into a sudden sleep.

Although information obtainer 6 obtains the physical information from cloud server 17 via the network in the present embodiment, this is not intended to be limiting. For example, the physical information may be obtained from a wearable terminal worn on the body of the driver. The wearable terminal is connected via the network to the measuring instruments including the weight scale that the driver has at home. Then, information from each of the measuring instruments is periodically stored as the physical information into the wearable terminal via the network. Alternatively, life log information detector 14*a* may detect the life log information by reading information recorded on, for example, Individual Number Card of the driver.

Although the life log information indicates the body shape of the driver in the present embodiment, this is not intended to be limiting. For example, the life log information may indicate (a) medical history of the driver, (b) working hours of the driver on the day before, (c) working style of the driver (such as night shift), (d) alcohol consumption of the driver on the day or the day before, (e) weight of the driver, (f) exercise time of the driver, (g) bedtime of the driver, (h) sleeping quality of the driver (such as a long sleeper), and (i) medication history of the driver. In this case, cloud server 17 stores various information about the life of the driver.

Figure 8:
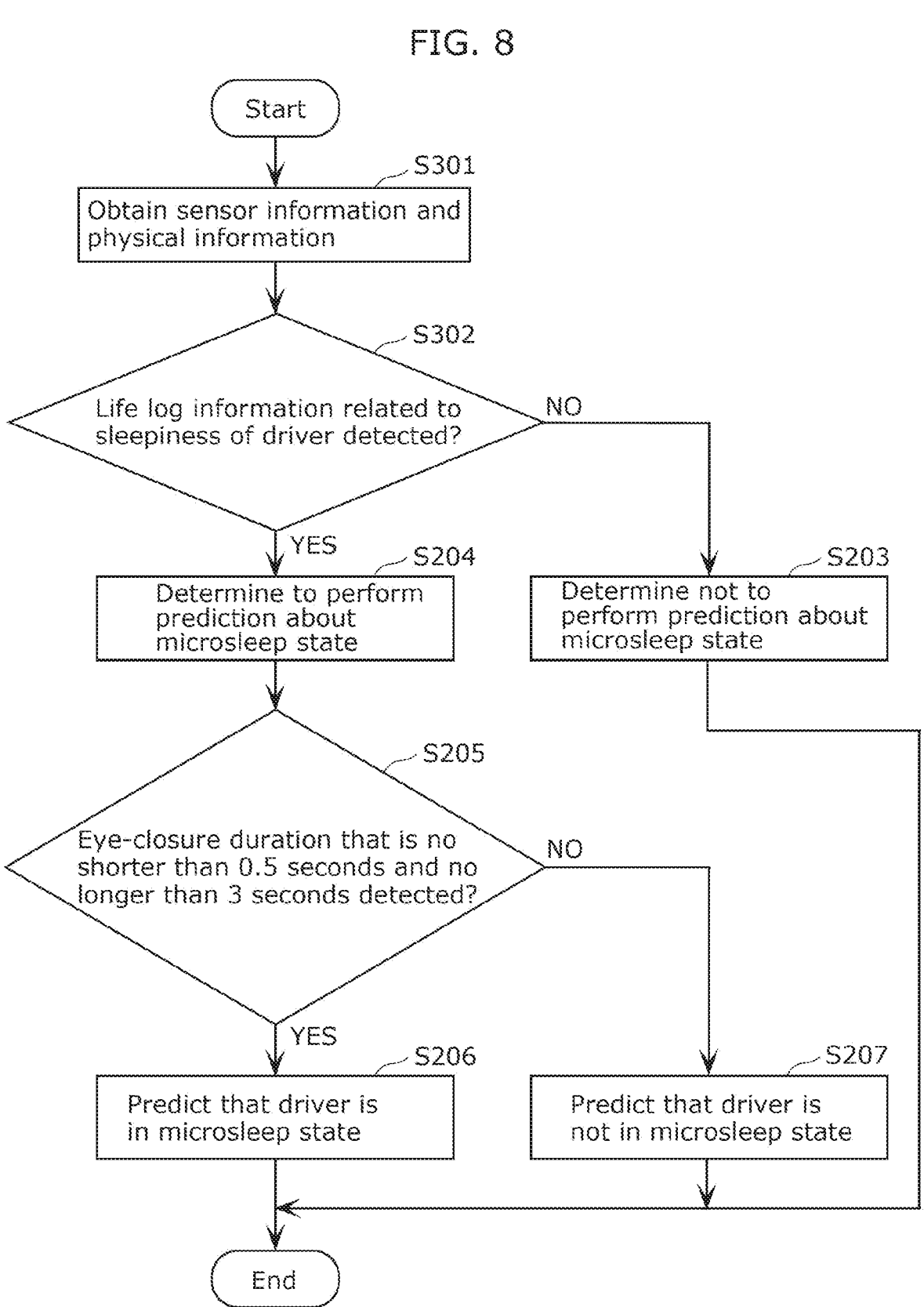
FIG. 8 is a flowchart of an operation performed by the prediction device according to Embodiment 2 in Application example 1 of the state detector.

Next, an operation performed by prediction device 2A according to Embodiment 2 in Application example 1 of state detector 14 is described with reference to FIG. 8. FIG. 8 is a flowchart of the operation performed by prediction device 2A according to Embodiment 2 in Application example 1 of state detector 14. Note that processes in the flowchart of FIG. 8 that are identical to those in FIG. 4 described above are denoted by step numbers identical to those used in FIG. 4, and that descriptions on these processes are thus omitted here.

As illustrated in FIG. 8, information obtainer 6 obtains the sensor information from sensor group 4 and also obtains the physical information from cloud server 17 (S301). Information obtainer 6 outputs the sensor information obtained from sensor group 4 to eye-closure duration detector 10 via determiner 8. Furthermore, information obtainer 6 outputs the physical information obtained from cloud server 17 to determiner 8.

After this, life log information detector 14*a* tries detecting the life log information related to the sleepiness of the driver, based on the physical information obtained from information obtainer 6. If life log information detector 14*a* does not detect the life log information related to the sleepiness of the driver (NO in S302), Step S203 is executed as described above. In contrast, if life log information detector 14*a* detects the life log information related to the sleepiness of the driver (YES in S302), Steps S204 to S207 are executed as described above.

2-7. Application Example 2 of State Detector

Figure 9:
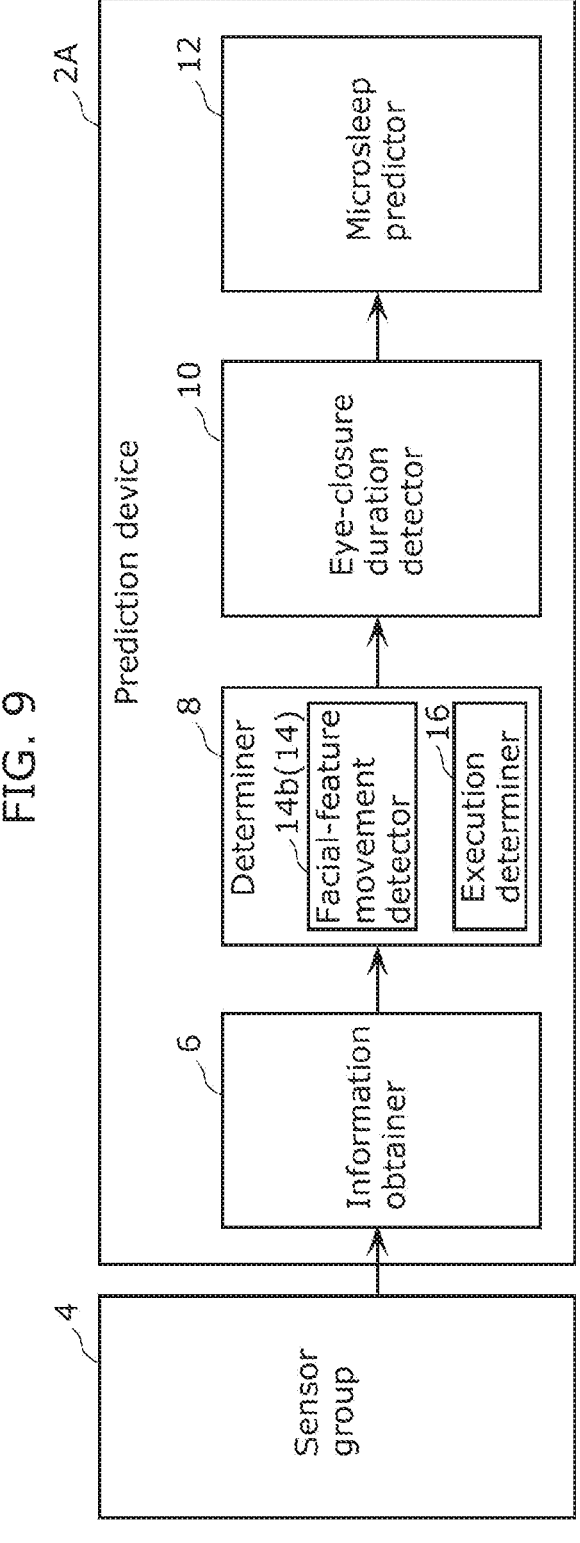
FIG. 9 is a block diagram illustrating a configuration of the prediction device according to Embodiment 2 in Application example 2 of the state detector.

Application example 2 of state detector 14 is described with reference to FIG. 9. FIG. 9 is a block diagram illustrating a configuration of prediction device 2A according to Embodiment 2 in Application example 2 of state detector 14. Note that structural components in the block diagram of FIG. 9 that are identical to those in FIG. 3 described above are denoted by reference marks identical to those used in FIG. 3, and that descriptions on these structural components are thus omitted here.

As illustrated in FIG. 9, state detector 14 in Application example 2 is facial-feature movement detector 14*b*. Facial-feature movement detector 14*b* chronologically detects facial-feature movement information that indicates a movement of a facial feature of the driver, based on the sensor information (image information, for example) obtained from information obtainer 6. The facial feature refers to a facial part, such as an eye or mouth. Facial-feature movement detector 14*b* outputs the detected facial-feature movement information to microsleep predictor 12 via eye-closure duration detector 10 and also to execution determiner 16.

Microsleep predictor 12 predicts that the driver is in the microsleep state, on conditions that facial-feature movement detector 14*b* detects the facial-feature movement information related to the sleepiness of the driver and that eye-closure duration detector 10 detects the eye-closure duration that is no shorter than 0.5 seconds and no longer than 3 seconds. Here, the facial-feature movement information related to the sleepiness of the driver indicates that the mouth of the driver stays open due to the sleepiness or that the sleepiness causes muscle relaxation around the eyes with no eyebrow movements, for example.

Figure 10:
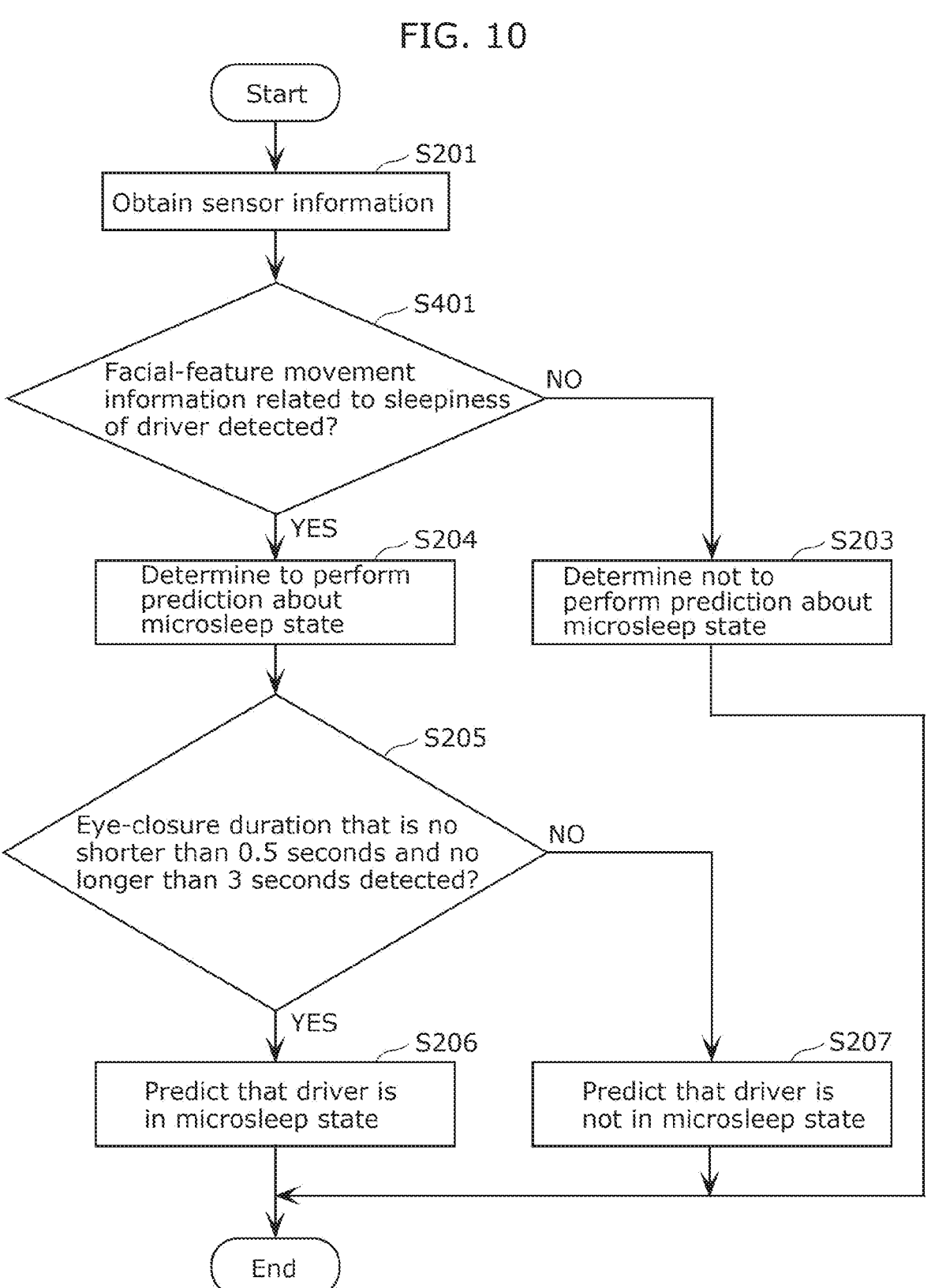
FIG. 10 is a flowchart of an operation performed by the prediction device according to Embodiment 2 in Application example 2 of the state detector.

Next, an operation performed by prediction device 2A according to Embodiment 2 in Application example 2 of state detector 14 is described with reference to FIG. 10. FIG. 10 is a flowchart of the operation performed by prediction device 2A according to Embodiment 2 in Application example 2 of state detector 14. Note that processes in the flowchart of FIG. 10 that are identical to those in FIG. 4 described above are denoted by step numbers identical to those used in FIG. 4, and that descriptions on these processes are thus omitted here.

As illustrated in FIG. 10, after Step S201 is executed as described above, facial-feature movement detector 14*b* tries detecting the facial-feature movement information related to the sleepiness of the driver, based on the sensor information obtained from information obtainer 6. If life log information detector 14*a* does not detect the facial-feature movement information related to the sleepiness of the driver (NO in S401), Step S203 is executed as described above. In contrast, if life log information detector 14*b* detects the facial-feature movement information related to the sleepiness of the driver (YES in S401), Steps S204 to S207 are executed as described above.

2-8. Application Example 3 of State Detector

Figure 11:
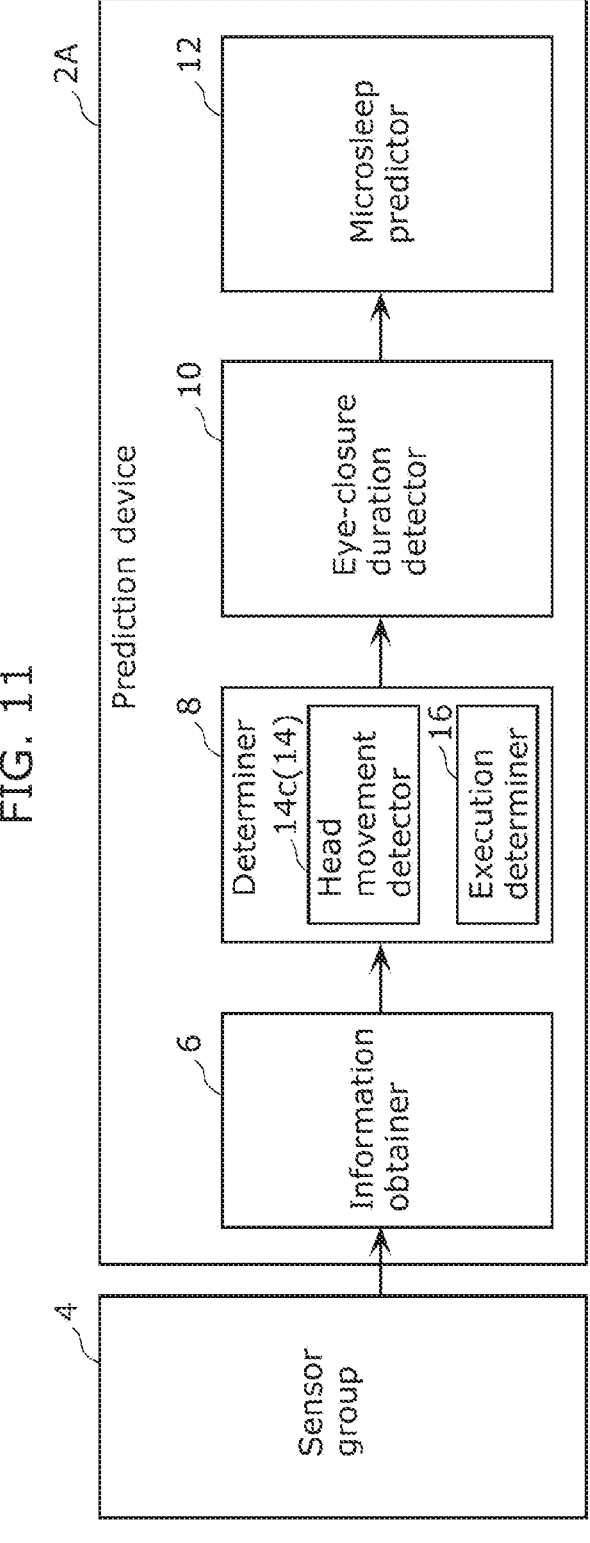
FIG. 11 is a block diagram illustrating a configuration of the prediction device according to Embodiment 2 in Application example 3 of the state detector.

Application example 3 of state detector 14 is described with reference to FIG. 11. FIG. 11 is a block diagram illustrating a configuration of prediction device 2A according to Embodiment 2 in Application example 3 of state detector 14. Note that structural components in the block diagram of FIG. 11 that are identical to those in FIG. 3 described above are denoted by reference marks identical to those used in FIG. 3, and that descriptions on these structural components are thus omitted here.

As illustrated in FIG. 11, state detector 14 in Application example 2 is head movement detector 14c. Head movement detector 14c chronologically detects head movement information that indicates a movement of the head of the driver, based on the sensor information (image information, for example) obtained from information obtainer 6. Head movement detector 14c outputs the detected head movement information to microsleep predictor 12 via eye-closure duration detector 10 and also to execution determiner 16.

Microsleep predictor 12 predicts that the driver is in the microsleep state, on conditions that head movement detector 14c detects the head movement information related to the sleepiness of the driver and that eye-closure duration detector 10 detects the eye-closure duration that is no shorter than 0.5 seconds and no longer than 3 seconds. Here, the head movement information related to the sleepiness of the driver indicates that the head of the driver moves up and down, or more specifically, indicates head movement that is so-called "nodding off", for example.

Next, an operation performed by prediction device 2A according to Embodiment 2 in Application example 3 of state detector 14 is described with reference to FIG. 12. FIG. 12 is a flowchart of the operation performed by prediction device 2A according to Embodiment 2 in Application example 3 of state detector 14. Note that processes in the flowchart of FIG. 12 that are identical to those in FIG. 4 described above are denoted by step numbers identical to those used in FIG. 4, and that descriptions on these processes are thus omitted here.

As illustrated in FIG. 12, after Step S201 is executed as described above, head movement detector 14c tries detecting the head movement information related to the sleepiness of the driver, based on the sensor information obtained from information obtainer 6. If head movement detector 14c does not detect the facial-feature movement information related to the sleepiness of the driver (NO in S501), Step S203 is executed as described above. In contrast, if head movement detector 14c detects the head movement information related to the sleepiness of the driver (YES in S501), Steps S204 to S207 are executed as described above.

2-9. Application Example 4 of State Detector

Figure 13:
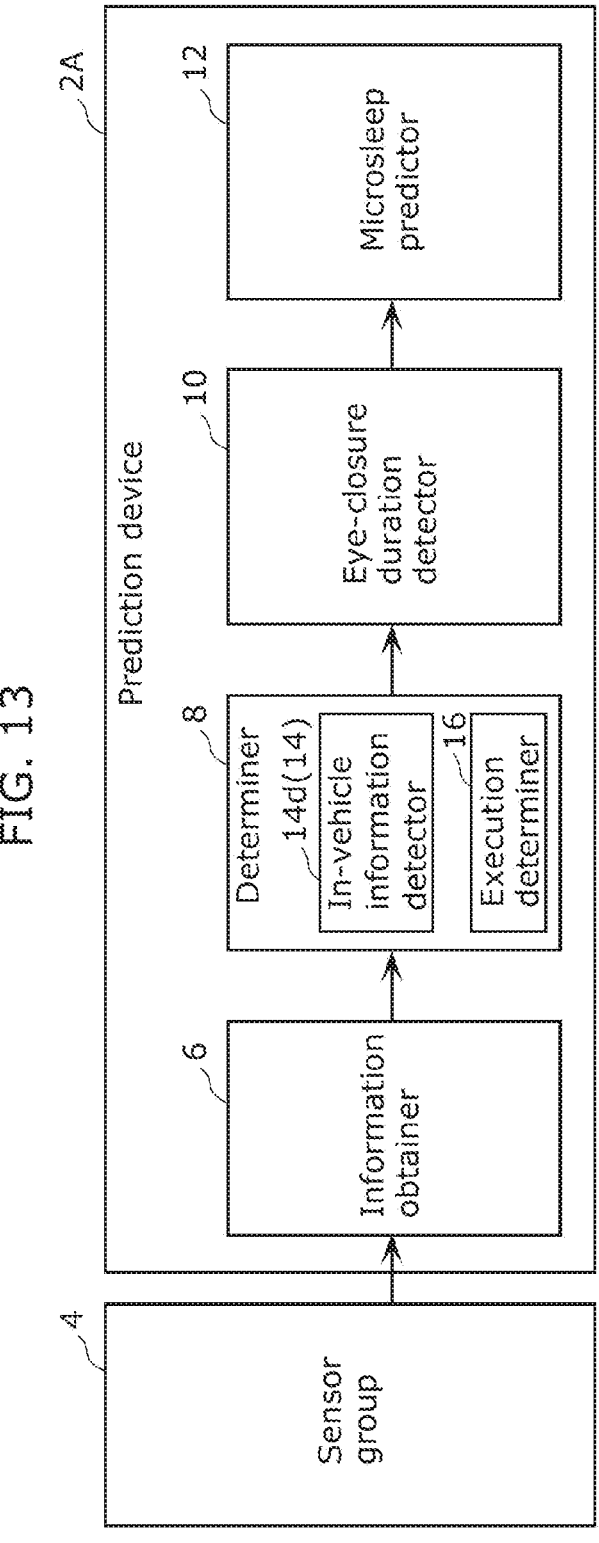
FIG. 13 is a block diagram illustrating a configuration of the prediction device according to Embodiment 2 in Application example 4 of the state detector.

Application example 4 of state detector 14 is described with reference to FIG. 13. FIG. 13 is a block diagram illustrating a configuration of prediction device 2A according to Embodiment 2 in Application example 4 of state detector 14. Note that structural components in the block diagram of FIG. 13 that are identical to those in FIG. 3 described above are denoted by reference marks identical to those used in FIG. 3, and that descriptions on these structural components are thus omitted here.

As illustrated in FIG. 13, state detector 14 in Application example 4 is in-vehicle information detector 14d. In-vehicle information detector 14d detects in-vehicle information that indicates a state inside the vehicle, based on the sensor information obtained from information obtainer 6. The in-vehicle information indicates voice of the driver having a conversation with a passenger, for example. In this case, sensor group 4 includes a microphone that detects voices in the vehicle and the sensor information is voice information indicating the voices detected by the microphone, for example. In-vehicle information detector 14d outputs the detected in-vehicle information to microsleep predictor 12 via eye-closure duration detector 10 and also to execution determiner 16.

Microsleep predictor 12 predicts that the driver is in the microsleep state, on conditions that in-vehicle information detector 14d detects the in-vehicle information related to the sleepiness of the driver and that eye-closure duration detector 10 detects the eye-closure duration that is no shorter than 0.5 seconds and no longer than 3 seconds. Here, the in-vehicle information related to the sleepiness of the driver is the voice information indicating that the driver did not respond to the passenger who was talking to the driver or that the driver responded to the passenger who was talking to the driver after more than a predetermined period of time (for example, 5 to 10 seconds).

Next, an operation performed by prediction device 2A according to Embodiment 2 in Application example 4 of state detector 14 is described with reference to FIG. 14. FIG. 14 is a flowchart of the operation performed by prediction device 2A according to Embodiment 2 in Application example 4 of state detector 14. Note that processes in the flowchart of FIG. 14 that are identical to those in FIG. 4 described above are denoted by step numbers identical to those used in FIG. 4, and that descriptions on these processes are thus omitted here.

As illustrated in FIG. 14, after Step S201 is executed as described above, in-vehicle information detector 14d tries detecting the in-vehicle information related to the sleepiness of the driver, based on the sensor information obtained from information obtainer 6. If in-vehicle information detector 14d does not detect the in-vehicle information related to the sleepiness of the driver (NO in S601), Step S203 is executed as described above. In contrast, if in-vehicle information detector 14d detects the in-vehicle information related to the sleepiness of the driver (YES in S601), Steps S204 to S207 are executed as described above.

2-10. Application Example 5 of State Detector

Figure 15:
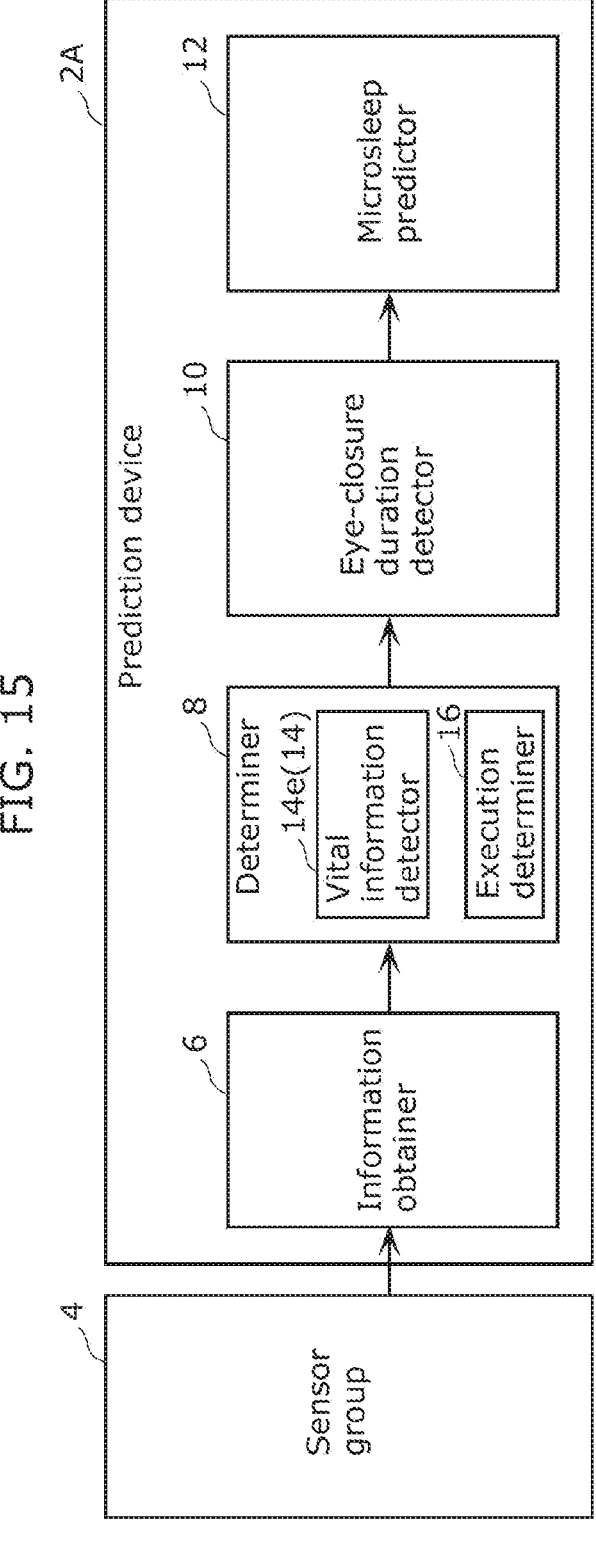
FIG. 15 is a block diagram illustrating a configuration of the prediction device according to Embodiment 2 in Application example 5 of the state detector.

Application example 5 of state detector 14 is described with reference to FIG. 15. FIG. 15 is a block diagram illustrating a configuration of prediction device 2A according to Embodiment 2 in Application example 5 of state detector 14. Note that structural components in the block diagram of FIG. 15 that are identical to those in FIG. 3 described above are denoted by reference marks identical to those used in FIG. 3, and that descriptions on these structural components are thus omitted here.

As illustrated in FIG. 15, state detector 14 in Application example 5 is vital information detector 14e. Vital information detector 14e detects vital information on the driver, based on the sensor information obtained from information obtainer 6. The vital information indicates brain waves of the driver, for example. In this case, sensor group 4 includes a brain-wave sensor that is disposed in a headrest of the driver seat of the vehicle (or worn on the head of the driver) and the sensor information indicates the brain waves of the driver detected by the brain-wave sensor, for example. Vital information detector 14e outputs the detected vital information to microsleep predictor 12 via eye-closure duration detector 10 and also to execution determiner 16.

Microsleep predictor 12 predicts that the driver is in the microsleep state, on conditions that vital information detector 14e detects the vital information related to the sleepiness of the driver and that eye-closure duration detector 10 detects the eye-closure duration that is no shorter than 0.5 seconds and no longer than 3 seconds. Here, the vital information related to the sleepiness of the driver indicates a sudden change in the brain waves of the driver, for example.

Figure 16:
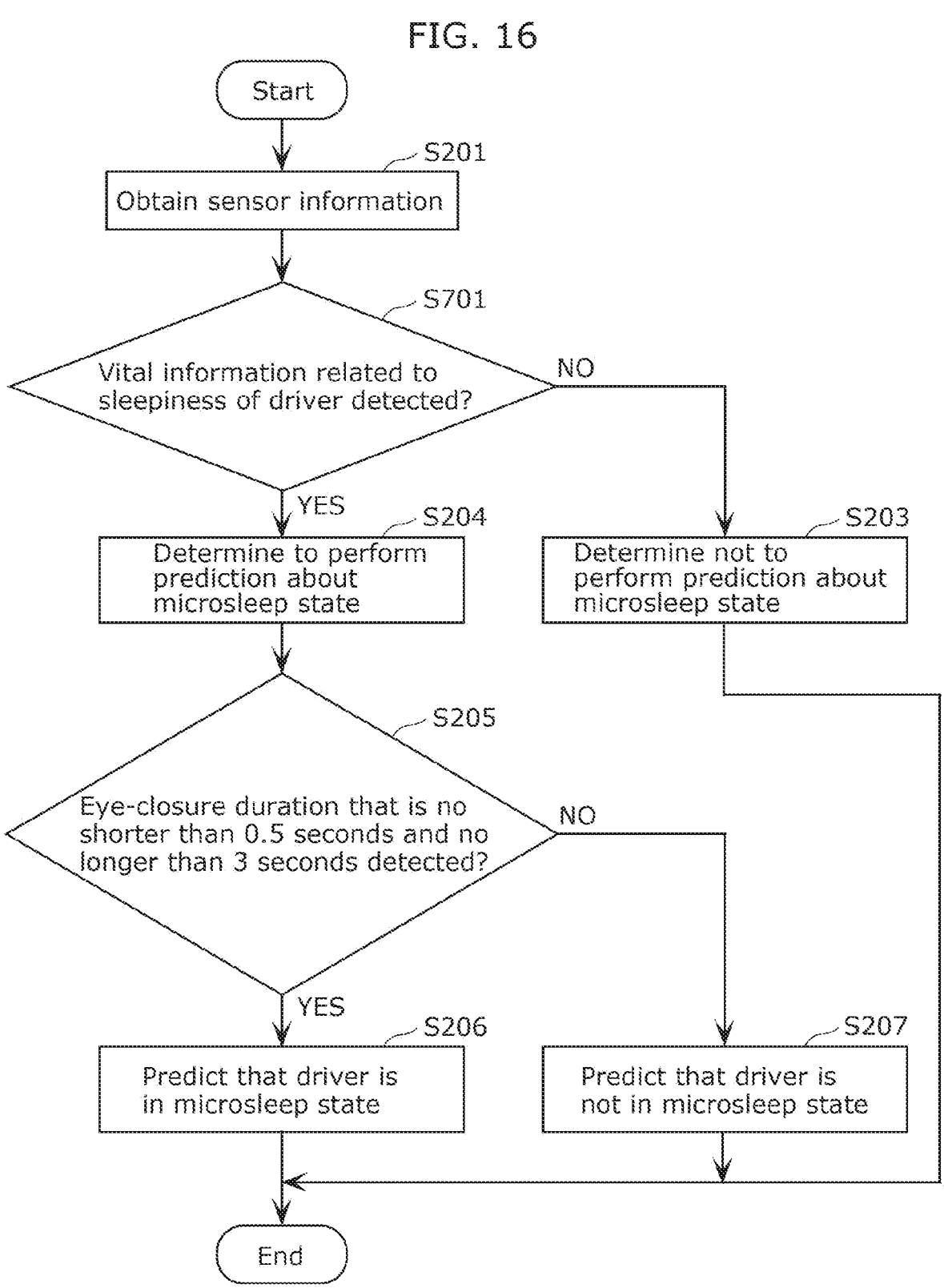
FIG. 16 is a flowchart of an operation performed by the prediction device according to Embodiment 2 in Application example 5 of the state detector.

Next, an operation performed by prediction device 2A according to Embodiment 2 in Application example 5 of state detector 14 is described with reference to FIG. 16. FIG. 16 is a flowchart of the operation performed by prediction device 2A according to Embodiment 2 in Application example 5 of state detector 14. Note that processes in the flowchart of FIG. 16 that are identical to those in FIG. 4 described above are denoted by step numbers identical to those used in FIG. 4, and that descriptions on these processes are thus omitted here.

As illustrated in FIG. 16, after Step S201 is executed as described above, vital information detector 14e tries detecting the vital information related to the sleepiness of the driver, based on the sensor information obtained from information obtainer 6. If vital information detector 14e does not detect the vital information related to the sleepiness of the driver (NO in S701), Step S203 is executed as described above. In contrast, if vital information detector 14e detects the vital information related to the sleepiness of the driver (YES in S701), Steps S204 to S207 are executed as described above.

2-11. Application Example 6 of State Detector

Application example 6 of state detector 14 is described with reference to FIG. 17. FIG. 17 is a block diagram illustrating a configuration of prediction device 2A according to Embodiment 2 in Application example 6 of state detector 14. Note that structural components in the block diagram of FIG. 17 that are identical to those in FIG. 3 described above are denoted by reference marks identical to those used in FIG. 3, and that descriptions on these structural components are thus omitted here.

As illustrated in FIG. 17, state detector 14 in Application example 6 is vehicle state detector 14f. Vehicle state detector 14f detects vehicle state information indicating state of the vehicle, based on the sensor information obtained from information obtainer 6. In this case, sensor group 4 includes a camera that is disposed in the vehicle to capture an image ahead of the vehicle and the sensor information is image information indicating the image captured by the camera, for example. Vehicle state detector 14f outputs the detected vehicle state information to microsleep predictor 12 via eye-closure duration detector 10 and also to execution determiner 16.

Microsleep predictor 12 predicts that the driver is in the microsleep state, on conditions that vehicle state detector 14f detects the vehicle state information related to the sleepiness of the driver and that eye-closure duration detector 10 detects the eye-closure duration that is no shorter than 0.5 seconds and no longer than 3 seconds. Here, the vehicle state information related to the sleepiness of the driver indicates lane departure of the vehicle, for example.

Note that sensor group 4 includes not only the aforementioned camera and may also include a steering angle sensor that detects a steering angle of the vehicle, for example. In this case, the sensor information may indicate the steering angle detected by the steering angle sensor.

Figure 18:
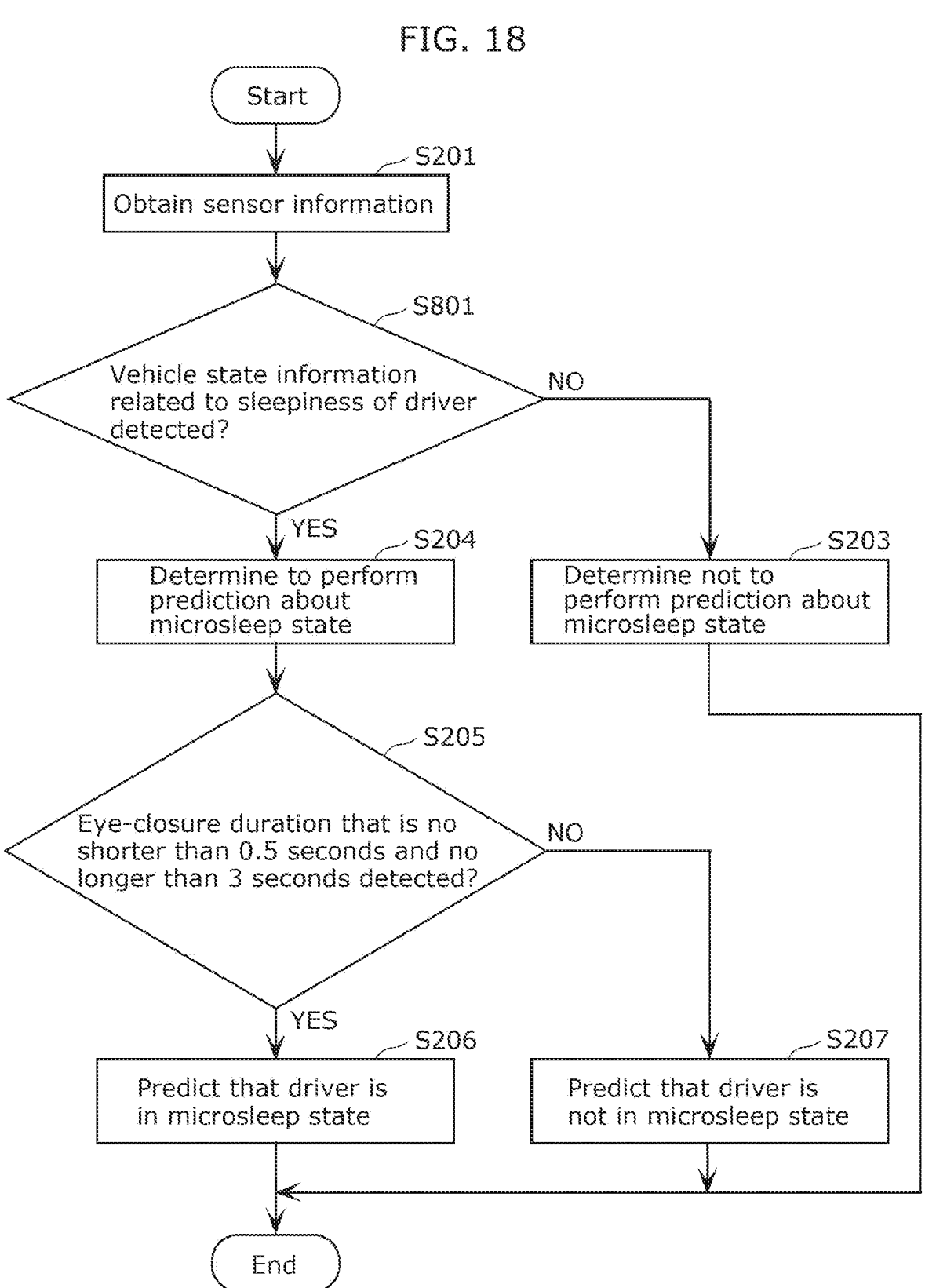
FIG. 18 is a flowchart of an operation performed by the prediction device according to Embodiment 2 in Application example 6 of the state detector.

Next, an operation performed by prediction device 2A according to Embodiment 2 in Application example 6 of state detector 14 is described with reference to FIG. 18. FIG. 18 is a flowchart of the operation performed by prediction device 2A according to Embodiment 2 in Application example 6 of state detector 14. Note that processes in the flowchart of FIG. 18 that are identical to those in FIG. 4 described above are denoted by step numbers identical to those used in FIG. 4, and that descriptions on these processes are thus omitted here.

As illustrated in FIG. 18, after Step S201 is executed as described above, vehicle state detector 14f tries detecting the vehicle state information related to the sleepiness of the driver, based on the sensor information obtained from information obtainer 6. If vehicle state detector 14f does not detect the in-vehicle information related to the sleepiness of the driver (NO in S801), Step S203 is executed as described above. In contrast, if vehicle state detector 14f detects the vehicle state information related to the sleepiness of the driver (YES in S801), Steps S204 to S207 are executed as described above.

2-12. Application Example 7 of State Detector

Figure 19:
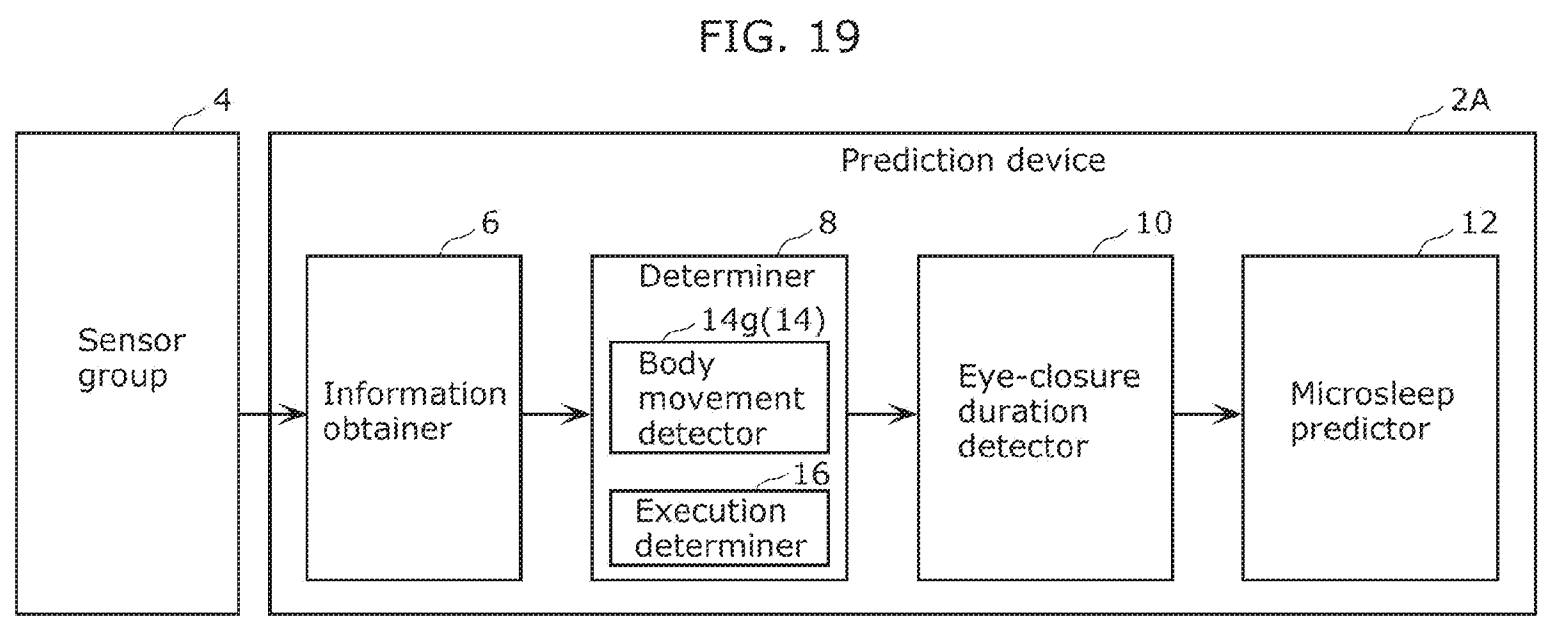

Application example 7 of state detector 14 is described with reference to FIG. 19. FIG. 19 is a block diagram illustrating a configuration of prediction device 2A according to Embodiment 2 in Application example 7 of state detector 14. Note that structural components in the block diagram of FIG. 19 that are identical to those in FIG. 3 described above are denoted by reference marks identical to those used in FIG. 3, and that descriptions on these structural components are thus omitted here.

As illustrated in FIG. 19, state detector 14 in Application example 7 is body movement detector 14g. Body movement detector 14g detects body movement information indicating a body movement of the driver, based on the sensor information obtained from information obtainer 6. In this case, sensor group 4 includes a pressure sensor that is disposed in a backrest or seating surface of the driver seat of the vehicle and the sensor information indicates the pressure detected by the pressure sensor. Body movement detector 14g outputs the detected body movement information to microsleep predictor 12 via eye-closure duration detector 10 and also to execution determiner 16.

Microsleep predictor 12 predicts that the driver is in the microsleep state, on conditions that body movement detector 14g detects the body movement information related to the sleepiness of the driver and that eye-closure duration detector 10 detects the eye-closure duration that is no shorter than 0.5 seconds and no longer than 3 seconds. Here, the body movement information related to the sleepiness of the driver indicates that the upper body of the driver swings back and forth (that is, the center of gravity of the driver moves back and forth) due to the sleepiness, for example.

Next, an operation performed by prediction device 2A according to Embodiment 2 in Application example 7 of state detector 14 is described with reference to FIG. 20. FIG. 20 is a flowchart of the operation performed by prediction device 2A according to Embodiment 2 in Application example 7 of state detector 14. Note that processes in the flowchart of FIG. 20 that are identical to those in FIG. 4 described above are denoted by step numbers identical to those used in FIG. 4, and that descriptions on these processes are thus omitted here.

As illustrated in FIG. 20, after Step S201 is executed as described above, body movement detector 14g tries detecting the body movement information related to the sleepiness of the driver, based on the sensor information obtained from information obtainer 6. If body movement detector 14g does not detect the body movement information related to the sleepiness of the driver (NO in S901), Step S203 is executed as described above. In contrast, if body movement detector 14g detects the body movement information related to the sleepiness of the driver (YES in S901), Steps S204 to S207 are executed as described above.

Embodiment 3

3-1. Configuration of Prediction Device

Figure 21:
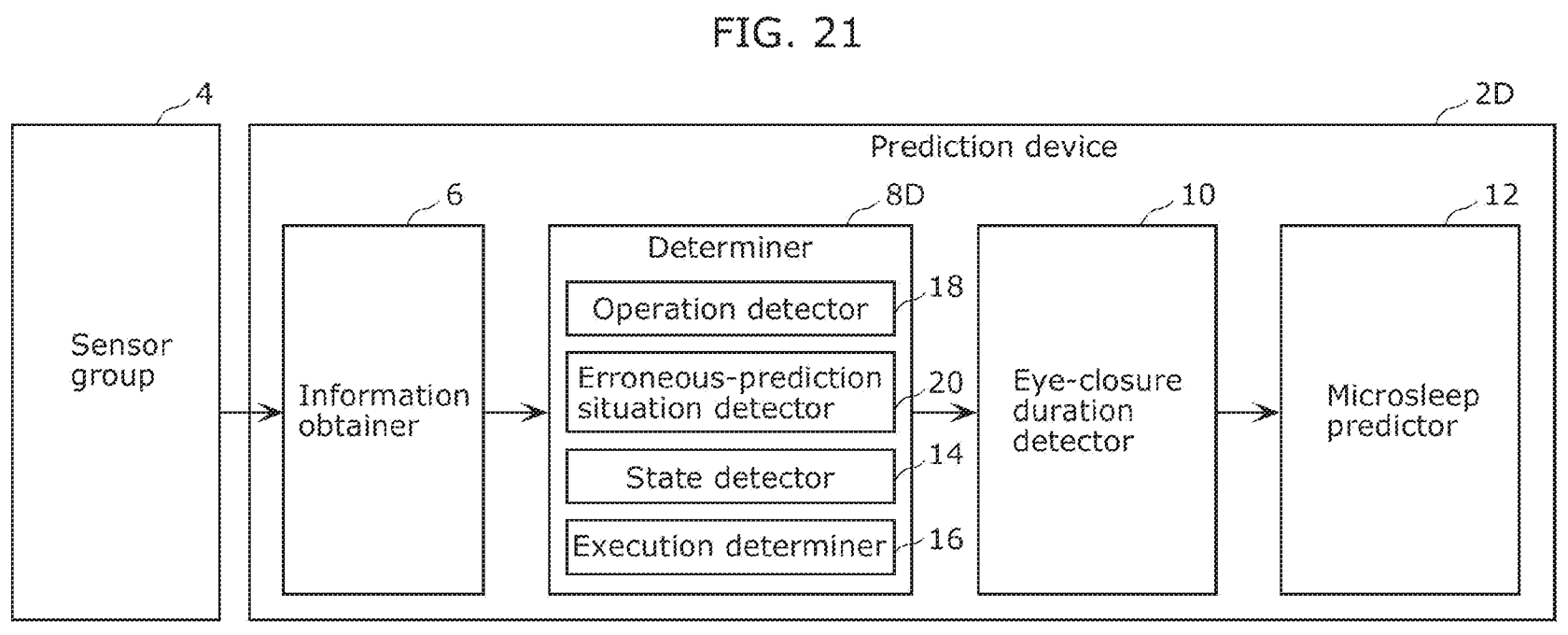

A configuration of prediction device 2D according to Embodiment 3 is described with reference to FIG. 21. FIG. 21 is a block diagram illustrating a configuration of prediction device 2D according to Embodiment 3. Note that structural components in the block diagram of FIG. 21 that are identical to those in FIG. 3 described above are denoted by reference marks identical to those used in FIG. 3, and that descriptions on these structural components are thus omitted here.

As illustrated in FIG. 21, determiner 8D of prediction device 2D according to the present embodiment includes operation detector 18 and erroneous-prediction situation detector 20 in addition to state detector 14 and execution determiner 16 described above in Embodiment 2.

Operation detector 18 detects an operation performed by the driver using the steering wheel or a car navigation system of the vehicle. Operation detector 18 outputs the detection result to erroneous-prediction situation detector 20.

Erroneous-prediction situation detector 20 detects whether there is an erroneous prediction situation that affects the prediction about the microsleep state of the driver made by microsleep predictor 12, based on the detection result received from operation detector 18. The erroneous prediction situation occurs when the driver is highly unlikely to feel sleepy because the driver grips the steering wheel firmly or operates the car navigation system, for example. Erroneous-prediction situation detector 20 outputs the detection result to execution determiner 16.

Execution determiner 16 determines whether microsleep predictor 12 is to perform prediction about the microsleep state of the driver, based on the detection results from state detector 14 and from erroneous-prediction situation detector 20. To be more specific, if erroneous-prediction situation detector 20 does not detect the erroneous prediction situation and state detector 14 detects the state related to the sleepiness of the driver, execution determiner 16 determines that microsleep predictor 12 is to perform prediction about the microsleep state of the driver. In contrast, if erroneous-prediction situation detector 20 detects the erroneous prediction situation state or detector 14 does not detect the state related to the sleepiness of the driver, execution determiner 16 determines that microsleep predictor 12 is not to perform prediction about the microsleep state of the driver.

3-2. Operation of Prediction Device

Figure 22:
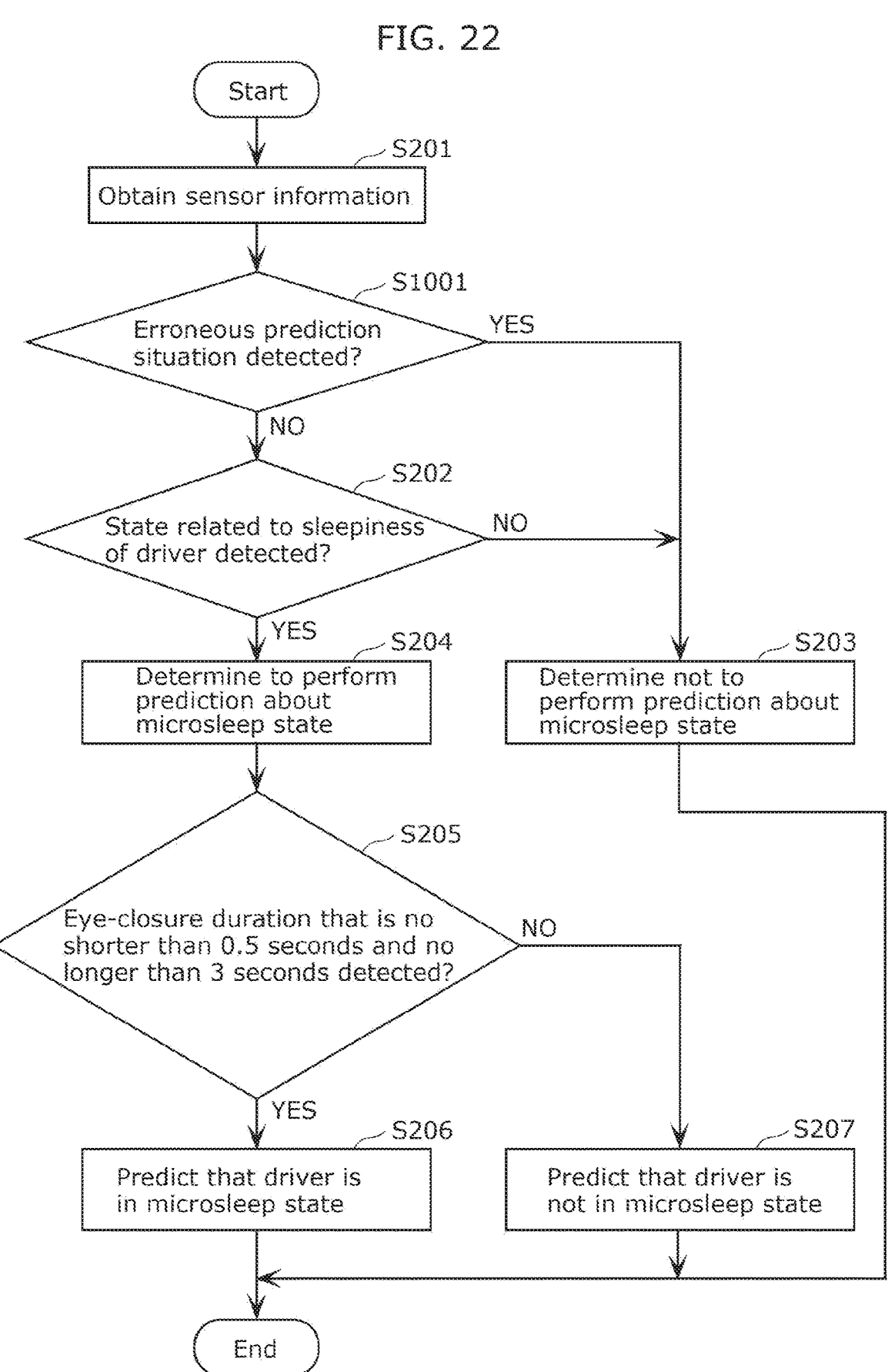
FIG. 22 is a flowchart of an operation performed by the prediction device according to Embodiment 3.

Next, an operation performed by prediction device 2D according to Embodiment 3 is described with reference to FIG. 22. FIG. 22 is a flowchart of the operation performed by prediction device 2D according to Embodiment 3. Note that processes in the flowchart of FIG. 22 that are identical to those in FIG. 4 described above are denoted by step numbers identical to those used in FIG. 4, and that descriptions on these processes are thus omitted here.

As illustrated in FIG. 22, after Step S201 is executed as described above, erroneous-prediction situation detector 20 detects whether there is an erroneous prediction situation based on the detection result from operation detector 18.

If erroneous-prediction situation detector 20 detects the erroneous prediction situation (YES in S1001), execution determiner 16 determines, based on the detection result from erroneous-prediction situation detector 20, that microsleep predictor 12 is not to perform prediction about the microsleep state of the driver (S203). In this case, microsleep predictor 12 does not predict the microsleep state of the driver.

Referring back to Step S1001, if erroneous-prediction situation detector 20 does not detect the erroneous prediction state (NO in S1001) and state detector 14 detects the state related to the sleepiness of the driver (YES in S202), execution determiner 16 determines, based on the detection results from state detector 14 and from erroneous-prediction situation detector 20, that microsleep predictor 12 is to perform prediction about the microsleep state of the driver (S204). After this, Steps S205 to S207 are executed as described above.

Referring back to Step S202, if state detector 14 does not detect the state related to the sleepiness of the driver (NO in S202), execution determiner 16 determines, based on the detection result from state detector 14, that microsleep predictor 12 is not to perform prediction about the microsleep state of the driver (S203).

3-3. Advantageous Effect

In the present embodiment, if erroneous-prediction situation detector 20 detects the erroneous prediction situation, execution determiner 16 determines that microsleep predictor 12 is not to perform prediction about the microsleep state of the driver. Thus, microsleep predictor 12 can avoid making an erroneous prediction on the microsleep state.

3-4. Variation

Although the erroneous prediction situation occurs when the driver operates the steering wheel or the car navigation system in the present embodiment, this is not intended to be limiting. For example, the erroneous prediction situation may occur when the driver just worked a night shift the night before and then took a nap for a few hours. In such a situation, the driver is highly unlikely to feel sleepy. Thus, erroneous-prediction situation detector 20 can detect whether there is the erroneous prediction situation based on the life log information, for example.

The erroneous prediction situation may occur when roadside trees cast small shadows on the face of the driver, for example. In such a situation, eye-closure duration detector 10 is unable to accurately detect the eye-closure duration. Thus, erroneous-prediction situation detector 20 can detect whether there is the erroneous prediction situation based on the image information obtained from sensor group 4, for example.

The erroneous prediction situation may occur when the face of the driver is bright in western sunlight. In such a situation, the driver may unavoidably close the eyes. Thus, erroneous-prediction situation detector 20 can detect whether there is the erroneous prediction situation based on the image information obtained from sensor group 4, for example.

The erroneous prediction situation may occur when the driver intentionally closes the eyes due to fatigue although the driver feels no strong sleepiness.

OTHER EMBODIMENTS

Although the prediction device according to one or more aspects of the present disclosure have been described based on the embodiments, the present disclosure is not limited to the embodiments. Those skilled in the art will readily appreciate that embodiments arrived at by making various modifications to the above embodiments or embodiments arrived at by selectively combining elements disclosed in the above embodiments without materially departing from the scope of the present disclosure may be included within one or more aspects of the present disclosure.

Each of the elements in each of the above embodiments may be configured in the form of an exclusive hardware product, or may be realized by executing a software program suitable for the element. Each of the elements may be realized by means of a program executing unit, such as a Central Processing Unit (CPU) or a processor, reading and executing the software program recorded on a recording medium such as a hard disk or a semiconductor memory. It should also be noted that a part or all of the functions in the prediction device according to each of the above embodiment may be implemented by executing a program by a processor such as a central processing unit (CPU).

It should also be noted that a part or all of the constituent elements included in each of the above-described devices may be implemented into an Integrated Circuit (IC) card or a single module which is attachable to and removable from the device. The IC card or the module is a computer system including a microprocessor, a ROM, a RAM, and the like. The IC card or the module may include the above-described super multi-function LSI. The microprocessor operates according to the computer program to cause the IC card or the module to execute its functions. The IC card or the module may have tamper resistance.

The present disclosure may be the above-described methods. The present disclosure may be a computer program when a computer executes these methods, or digital signals forming the computer program. The present disclosure may be a non-transitory computer-readable recording medium on which the computer program or the digital signals are recorded. Examples of the non-transitory computer-readable recording medium are a flexible disk, a hard disk, a Compact Disc-Read Only Memory (CD-ROM), a magnetooptic disk (MO), a Digital Versatile Disc (DVD), a DVD-ROM, a DVD-RAM, a BD (Blu-ray® Disc), and a semiconductor memory. The present disclosure may be the digital signals recorded on the recording medium. The present disclosure may be implemented by transmitting the computer program or the digital signals via an electric communication line, a wired or wireless communication line, a network represented by the Internet, data broadcasting, and the like. The present disclosure may be a computer system including a microprocessor and a memory. The memory stores the computer program and the microprocessor operates according to the computer program. It is also possible that the program or the digital signals may be recorded onto the recording medium to be transferred, or may be transmitted via a network or the like, so that the program or the digital signals can be executed by a different independent computer system.

While various embodiments have been described herein above, it is to be appreciated that various changes in form and detail may be made without departing from the spirit and scope of the present disclosure as presently or hereafter claimed.

Further Information about Technical Background to this Application

The disclosure of the following patent application including specification, drawings, and claims are incorporated herein by reference in their entirety: Japanese Patent Application No. 2022-171478 filed on Oct. 26, 2022.

INDUSTRIAL APPLICABILITY

The present disclosure is applicable to a prediction device that predicts the microsleep state of a driver of a vehicle, for example.

The invention claimed is:

1. A vehicle that predicts that a driver is in a microsleep state, the vehicle comprising:
a biosensor that detects biological information of the driver;
an image sensor that captures image information of the driver;
a state detecting circuit that detects, based on the biological information detected by the biosensor, a state related to sleepiness of the driver;
an eye-closure duration detecting circuit that detects an eye-closure duration of the driver based on the image information captured by the image sensor;
a microsleep predicting circuit that predicts that the driver is in the microsleep state, on conditions that the state detecting circuit detects the state related to the sleepiness of the driver and that the eye-closure duration detecting circuit detects the eye-closure duration that is no shorter than a first duration and no longer than a second duration; and
an execution determining circuit that determines that the microsleep predicting circuit is to perform prediction about the microsleep state of the driver when the state detecting circuit detects the state related to the sleepiness of the driver, and determines that the microsleep predicting circuit is not to perform prediction about the microsleep state of the driver when the state detecting circuit does not detect the state related to the sleepiness of the driver.

2. The vehicle according to claim 1,
wherein the first duration is 0.5 seconds and the second duration is 3 seconds.

3. The vehicle according to claim 1,
wherein the state detecting circuit detects life log information about life of the driver as the state related to the sleepiness of the driver, and
the microsleep predicting circuit predicts that the driver is in the microsleep state, on conditions that the state detecting circuit detects the life log information and that the eye-closure duration detecting circuit detects the eye-closure duration that is no shorter than the first duration and no longer than the second duration.

4. The vehicle according to claim 1,
wherein the state detecting circuit detects facial-feature movement information indicating a movement of a facial feature of the driver as the state related to the sleepiness of the driver, and
the microsleep predicting circuit predicts that the driver is in the microsleep state, on conditions that the state detecting circuit detects the facial-feature movement information and that the eye-closure duration detecting circuit detects the eye-closure duration that is no shorter than the first duration and no longer than the second duration.

5. The vehicle according to claim 1,
wherein the state detecting circuit detects head movement information indicating a movement of a head of the driver as the state related to the sleepiness of the driver, and the microsleep predicting circuit predicts that the driver is in the microsleep state, on conditions that the state detecting circuit detects the head movement information and that the eye-closure duration detecting circuit detects the eye-closure duration that is no shorter than the first duration and no longer than the second duration.

6. The vehicle according to claim 1, wherein the state detecting circuit detects in-vehicle information indicating a state inside the vehicle as the state related to the sleepiness of the driver, and the microsleep predicting circuit predicts that the driver is in the microsleep state, on conditions that the state detecting circuit detects the in-vehicle information and that the eye-closure duration detecting circuit detects the eye-closure duration that is no shorter than the first duration and no longer than the second duration.

7. The vehicle according to claim 1, wherein the state detecting circuit detects vital information on the driver as the state related to the sleepiness of the driver, and the microsleep predicting circuit predicts that the driver is in the microsleep state, on conditions that the state detecting circuit detects the vital information and that the eye-closure duration detecting circuit detects the eye-closure duration that is no shorter than the first duration and no longer than the second duration.

8. The vehicle according to claim 1, wherein the state detecting circuit detects vehicle state information indicating state of the vehicle as the state related to the sleepiness of the driver, and the microsleep predicting circuit predicts that the driver is in the microsleep state, on conditions that the state detecting circuit detects the vehicle state information and that the eye-closure duration detecting circuit detects the eye-closure duration that is no shorter than the first duration and no longer than the second duration.

9. The vehicle according to claim 1, wherein the state detecting circuit detects body movement information indicating a body movement of the driver as the state related to the sleepiness of the driver, and the microsleep predicting circuit predicts that the driver is in the microsleep state, on conditions that the state detecting circuit detects the body movement information and that the eye-closure duration detecting circuit detects the eye-closure duration that is no shorter than the first duration and no longer than the second duration.

10. A vehicle that predicts that a driver is in a microsleep state, the vehicle comprising:
a biosensor that detects biological information of the driver;
an image sensor that captures image information of the driver;

a state detecting circuit that detects, based on the biological information detected by the biosensor, a state related to sleepiness of the driver;
an eye-closure duration detecting circuit that detects an eye-closure duration of the driver based on the image information captured by the image sensor;
a microsleep predicting circuit that predicts that the driver is in the microsleep state, on conditions that the state detecting circuit detects the state related to the sleepiness of the driver and that the eye-closure duration detecting circuit detects the eye-closure duration that is no shorter than a first duration and no longer than a second duration; and
an erroneous-prediction situation detecting circuit that detects an erroneous prediction situation that affects prediction about the microsleep state of the driver made by the microsleep predicting circuit,
wherein the microsleep predicting circuit is not to perform prediction about the microsleep state of the driver when the erroneous-prediction situation detecting circuit detects the erroneous prediction situation.

11. A prediction method of predicting that a driver of a vehicle is in a microsleep state, the prediction method comprising:
detecting, by a biosensor of the vehicle, biological information of the driver;
capturing, by an image sensor of the vehicle, image information of the driver;
detecting, by a state detecting circuit of the vehicle and based on the biological information detected by the biosensor, a state related to sleepiness of the driver;
detecting, by an eye-closure duration detecting circuit of the vehicle, an eye-closure duration of the driver based on the image information captured by the image sensor; and
predicting, by a microsleep predicting circuit of the vehicle, that the driver is in the microsleep state, on conditions that the state related to the sleepiness of the driver is detected by the state detecting circuit and that the eye-closure duration that is no shorter than a first duration and no longer than a second duration is detected by the eye-closure duration detecting circuit; and
determining, by an execution determining circuit of the vehicle, that the microsleep predicting circuit is to perform prediction about the microsleep state of the driver when the state detecting circuit detects the state related to the sleepiness of the driver, and determines that the microsleep predicting circuit is not to perform prediction about the microsleep state of the driver when the state detecting circuit does not detect the state related to the sleepiness of the driver.

* * * * *